United States Patent
Hotta

(10) Patent No.: US 6,982,407 B2
(45) Date of Patent: Jan. 3, 2006

(54) PHOTOELECTRIC CONVERSION UNIT HAVING A PLURALITY OF PHOTOELECTRIC CONVERSION SURFACES AND SYSTEMS AND METHODS FOR MEASURING LOCATION AND/OR DIRECTION USING THE PHOTOELECTRIC CONVERSION UNIT

(75) Inventor: Hiroyuki Hotta, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 108 days.

(21) Appl. No.: 10/243,841

(22) Filed: Sep. 16, 2002

(65) Prior Publication Data

US 2003/0052255 A1    Mar. 20, 2003

(30) Foreign Application Priority Data

Sep. 17, 2001   (JP) .............................. 2001-280945

(51) Int. Cl.
    *G06M 7/00*   (2006.01)
(52) U.S. Cl. .................. 250/221; 250/206.2; 345/158
(58) Field of Classification Search ............... 250/221, 250/203.1–203.6, 208.1, 208.2, 206.1, 206.2; 348/116, 47; 345/157, 158, 180–183; 356/3.06, 356/3.08
See application file for complete search history.

(56) References Cited

U.S. PATENT DOCUMENTS 4,225,781 A  *  9/1980  Hammons ................ 250/203.4
5,393,970 A  *  2/1995  Shau et al. ............... 250/206.2

FOREIGN PATENT DOCUMENTS

JP    U 5-25525    4/1993
JP    A 10-9812    1/1998

* cited by examiner

*Primary Examiner*—Thanh X. Luu
(74) *Attorney, Agent, or Firm*—Oliff, Berridge PLC

(57) ABSTRACT

A pointing position or direction is accurately determined with a simple constitution without burden to a user. A pair of PDs (photodiodes) forming one photoelectric conversion unit provide a light receiving surface of valley fold with respect to a light source, and another pair of PDs forming the photoelectric conversion unit provide a light receiving surface of mountain fold with respect to the light source. In the same manner, a pair of PDs forming another photoelectric conversion unit provide a light receiving surface of valley fold, and another pair of PDs forming the photoelectric conversion unit provide a light receiving surface of mountain fold. The outputs from the light receiving surfaces of valley fold and mountain fold are averaged in the respective photoelectric conversion units to countervail an error caused from the both, whereby the position of the light source can be accurately located.

37 Claims, 25 Drawing Sheets

PHOTOELECTRIC CONVERSION UNIT HAVING A PLURALITY OF PHOTOELECTRIC CONVERSION SURFACES AND SYSTEMS AND METHODS FOR MEASURING LOCATION AND/OR DIRECTION USING THE PHOTOELECTRIC CONVERSION UNIT

BACKGROUND OF THE INVENTION

1. Field of the Invention

The present invention relates to a technique for locating position of a pointer or the like, and more particularly, the invention is to provide such a position locating technique that is superior to the operability of a pointer, such as a computer mouse, and is suitable for a pointing device realizing barrier free, for example, upon operating mobile devices represented by notebook computers.

2. Description of the Related Art

As a pointing device for a personal computer, various kinds of devices have been used, such as computer mice, track balls, joysticks and sheet-like devices. According to the reports relating to the operability of the devices, mice have the best operability in speed and accuracy upon positioning, and therefore, a mouse is to be appended even in the case of mobile environments when the operability is prioritized.

However, in view of increasing variety of the mobile environments and increasing demands in input of characters and images, there is importance in developing pointing devices having good operability other than mice. Furthermore, because there are a number of cases where difficulties occur on operating mice and pens, it is demanded to develop such a new input device that solves the problem from the standpoint of barrier free.

Several kinds of devices have been developed to meet the demands. For example, there are such techniques that a position on a plane is located by using a special tablet, such as the position input tablet produced by Wacom Co., Ltd., and a position on a plane is located by using a two-dimensional semiconductor sensor (PSD) and a lens as disclosed in JP-A-5-25525.

Furthermore, JP-A-10-9812 discloses a technique for locating a position of a light source with a small and inexpensive device, in which light emitted from an input device is measured with a device constituted with photoelectric conversion elements (photodiode (PD)) combined in an L-shape arrangement.

The position input tablet is disadvantageous in miniaturization because it requires such a tablet below a display screen that has a larger area than that of the display screen, and it is impossible to replace only the display screen. Furthermore, there are some cases where the device is difficult to be used by persons having dysfunction of upper extremities because a pen is necessarily moved on the surface of the tablet. Moreover, the device uses an electromagnetic induction system, and thus it has a problem in that there is limitation in reducing the cost.

The system disclosed in JP-A-5-25525 has such an advantage that it enables a pointing operation in an arbitrary region in space, but it has been decided that the device is insufficient as a pointing device of a mobile equipment, which is suffering severe price-reduction, due to the use of expensive PSD and hence, has not yet been put into practical use.

In the system disclosed in JP-A-10-9812, cost reduction is realized since a photoelectric conversion unit formed by combining two photoelectric conversion elements is used as a fundamental unit, but it has a problem in accuracy because the distances between an indicating device (light source) and the respective photoelectric conversion elements are fluctuated by movement of the light source. For example, the device generates an error of about 8 mm upon measurement on an A-4 size plane, and the error is further increased by tilting the light source.

As described herein, the conventional techniques require a large tablet or an expensive measuring device other than a display screen, and those techniques that solve the problems suffer considerable errors.

SUMMARY OF THE INVENTION

The invention is to solve the foregoing problems associated with the conventional art in the following manner.

The invention provides, as one aspect, a photoelectric conversion unit including: a first photoelectric conversion surface; a second photoelectric conversion surface which faces the first photoelectric conversion surface at an angle of less than 180°; and a third photoelectric conversion surface which has an angle of greater than 180° to the second photoelectric conversion surface, wherein the first, second and third photoelectric conversion surfaces are arranged to face a diffused light source simultaneously.

The invention provides, as another aspect, an apparatus for measuring a location and/or a direction, including: a photoelectric conversion unit which has a first photoelectric conversion surface, a second photoelectric conversion surface which faces the first photoelectric conversion surface at an angle of less than 180° and a third photoelectric conversion surface which has an angle of greater than 180° to the second photoelectric conversion surface, wherein the first, second and third photoelectric conversion surfaces are arranged to face a diffused light source simultaneously; and a unit for calculating a value with regard to a location of and/or a direction to the diffused light source by using outputs of the first, second and third photoelectric conversion surfaces.

The invention also provides, as another aspect, a method for measuring a location and/or a direction, including the steps of: detecting a diffused light of a diffused light source by a photoelectric conversion unit which has a first photoelectric conversion surface, a second photoelectric conversion surface which faces the first photoelectric conversion surface at an angle of less than 180° and a third photoelectric conversion surface which has an angle of greater than 180° to the second photoelectric conversion surface, wherein the first, second and third photoelectric conversion surfaces are arranged to face the diffused light source simultaneously; and calculating a value with regard to a location of and/or a direction to the diffused light source by using outputs of the first, second and third photoelectric conversion surfaces.

In the foregoing constitutions, the output photoelectric conversion surfaces are used complementarily to each other to countervail an error caused by the arrangement of photoelectric conversion surfaces, whereby accurate positional localization can be realized in low cost.

The invention can be practiced not only as an apparatus or a system but also in an embodiment of a process, and at least a part thereof can be practiced by a computer program or by an analog circuit.

BRIEF DESCRIPTION OF THE DRAWINGS

Preferred embodiments of the invention will be described in detail based on the following figures wherein.

DESCRIPTION OF THE PREFERRED EMBODIMENTS

The invention will be described in detail with reference to preferred embodiments of an apparatus for locating a position of the invention.

(Basic Principles)

The basic principles (the method shown in JP-A-10-9812), on which the invention is based, will be described with reference to FIGS. 1 and 2. In this example, which will be described herein, for simplicity, the number of photoelectric conversion elements in a photoelectric conversion unit is two, and position locating on a two-dimensional plane is carried out by providing two of the photoelectric conversion units.

Figure 1:
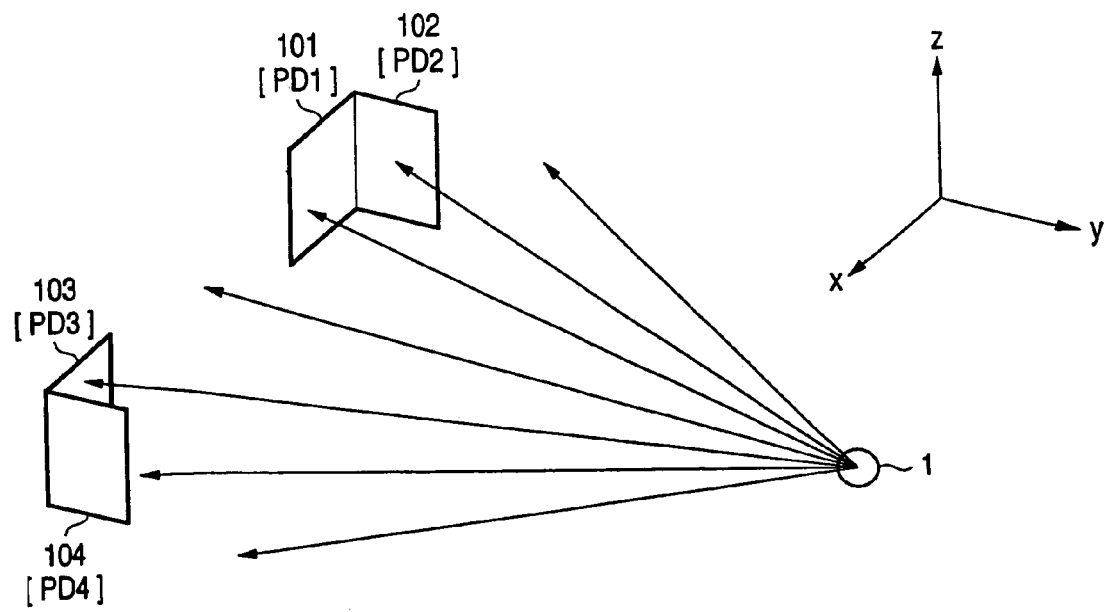
FIG. 1 is a basic constitutional diagram showing an example of a two-dimensional positional locating apparatus.

FIG. 1 is a perspective view of an apparatus for locating a position, on which the invention is based. Photodiodes (hereinafter abbreviated as PD) 101, 102, 103 and 104 (PD1, PD2, PD3 and PD4), which are ordinarily used as a light accepting element, are arranged perpendicular to an xy plane, which is the two-dimensional plane, on which position locating is to be carried out. Two PDs proximate to each other are arranged to make an angle of 90° viewing the two-dimensional plane from above, so as to form one unit of the photoelectric conversion unit, and two or more units are provided. The figure shows an example where two units are provided. The PDs are irradiated with light from a light source 1, and the light receiving surfaces of all the PDs face toward the light source.

Figure 2:
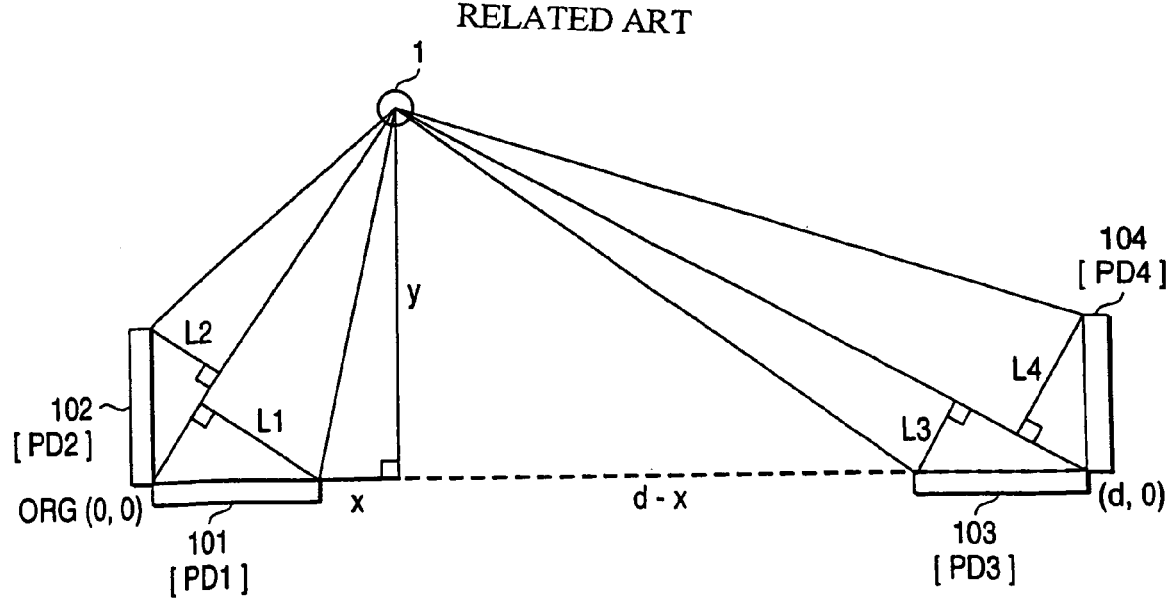
FIG. 2 is a diagram showing the measurement fundamental of the apparatus shown in FIG. 1.

FIG. 2 is a top view of the constitutional example, which also functions as a diagram showing the measurement fundamental, on which the invention is based. In order for simplicity of equations, the areas and the length viewed from above of the PDs proximate to each other within one photoelectric conversion unit are the same as each other. As shown in the figure, at this time, the appellations of the PDs are designated as PD1, PD2, PD3 and PD4, the coordinate of the intersecting point formed by the leftward two PDs is designated as the origin (0,0), the coordinate of the intersecting point formed by the rightward two PDs is designated as (d,0), the coordinate of the light source 1 is designated as (x,y), the lengths of the respective PDs are designated as L, the bottoms on the light source side of the right angel triangles having oblique lines having the lengths L are designated as L1, L2, L3 and L4, and the outputs of the respective PDs are designated as V1, V2, V3 and V4 corresponding to the appellations of the bottoms.

Calculating equations for the position using the outputs of the PDs in this constitution will be described.

In each pair of PDs constituting the photoelectric conversion units, the two right angle triangles having the lengths L as oblique lines (those having L1 and L2 as the bottom and those having L3 and L4 as the bottom) are congruent to each other. These right angle triangles and the right angle triangles having segments connecting two intersecting points of PDs and the light source as oblique lines are similar to each other. The following equations (1) and (2) are derived under the conditions.

$$L2/L1 = x/y \tag{1}$$

$$L4/L3 = (d-x)/y \tag{2}$$

The outputs of the respective PDs are in proportion to the bottoms of the right angle triangles having the PDs as oblique lines, and the following equations (3), (4) and (5) are derived.

$$L2/L1 = V2/V1 \quad (3)$$

$$L4/L3 = V4/V3 \quad (4)$$

$$(V4/V3)/(V2/V1) = (L4/L3)/(L2/L1) \quad (5)$$
$$= ((d-x)/y)/(x/y)$$
$$= d/x - 1$$

The following equation (6) representing x is derived from the equation (5).

$$x = d \cdot (1/(1 + (V4/V3)/(V2/V1))) \quad (6)$$
$$= d \cdot (V2/V1)/((V4/V3) + (V2/V1))$$

The following equation (7) representing y is derived by substituting the equation (6) for the equations (1) and (3).

$$y = (V1/V2) \cdot x \quad (7)$$
$$= (V1/V2) \cdot d \cdot (V2/V1)/((V4/V3) + (V2/V1))$$
$$= d/((V4/V3) + (V2/V1))$$

Figure 3:
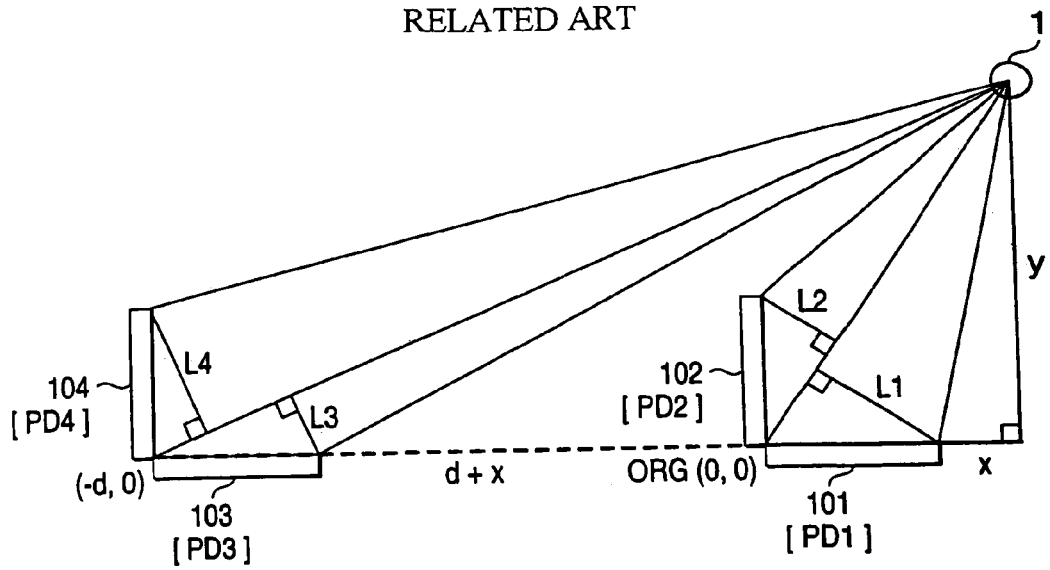
FIG. 3 is a diagram showing the measurement fundamental shown in FIG. 2 where the positions of the photodiodes are changed.

FIG. 3 shows an example where the photoelectric conversion unit of PD3 and PD4 is arranged on the same side as the photoelectric conversion unit of PD1 and PD2. In this case, the distance d−x in the equation (2) becomes d+x, and it is necessary that the equations (5), (6) and (7) are converted to the following equations (8), (9) and (10).

$$(V4/V3)/(V2/V1) = (L4/L3)/(L2/L1) \quad (8)$$
$$= ((d+x)/y)/(x/y)$$
$$= d/x + 1$$
$$x = d \cdot (1/((V4/V3)/(V2/V1) - 1)) \quad (9)$$
$$= d \cdot (V2/V1)/((V4/V3) - (V2/V1))$$
$$y = (V1/V2) \cdot x \quad (10)$$
$$= (V1/V2) \cdot d \cdot (V2/V1)/((V4/V3) - (V2/V1))$$
$$= d/((V4/V3) - (V2/V1))$$

In the constitutions shown in FIGS. 1 to 3, the angles between the straight lines from the light source 1 toward the intersecting points of the two PDs, i.e., (0,0), (d,0) and (−d,0), and the light receiving surfaces of the respective PDs are 90° or less. In other words, the two PDs proximate to each other in the photoelectric conversion unit are arranged like to be bent inwardly (i.e., valley fold with respect to the light source 1). On the other hand, it is also possible that the angles between the straight lines and the light receiving surfaces of the respective PDs are 90° or more (180° or less), in other words, the two PDs proximate to each other in the photoelectric conversion unit may be arranged like to be bent outwardly (i.e., mountain fold with respect to the light source 1), and the cases are shown in FIGS. 4 to 6.

In these cases, L1, L2, L3 and L4 are set as similar to the cases shown in FIGS. 1 to 3, and the equations (1) to (10) can be applied as they are.

Figure 4:
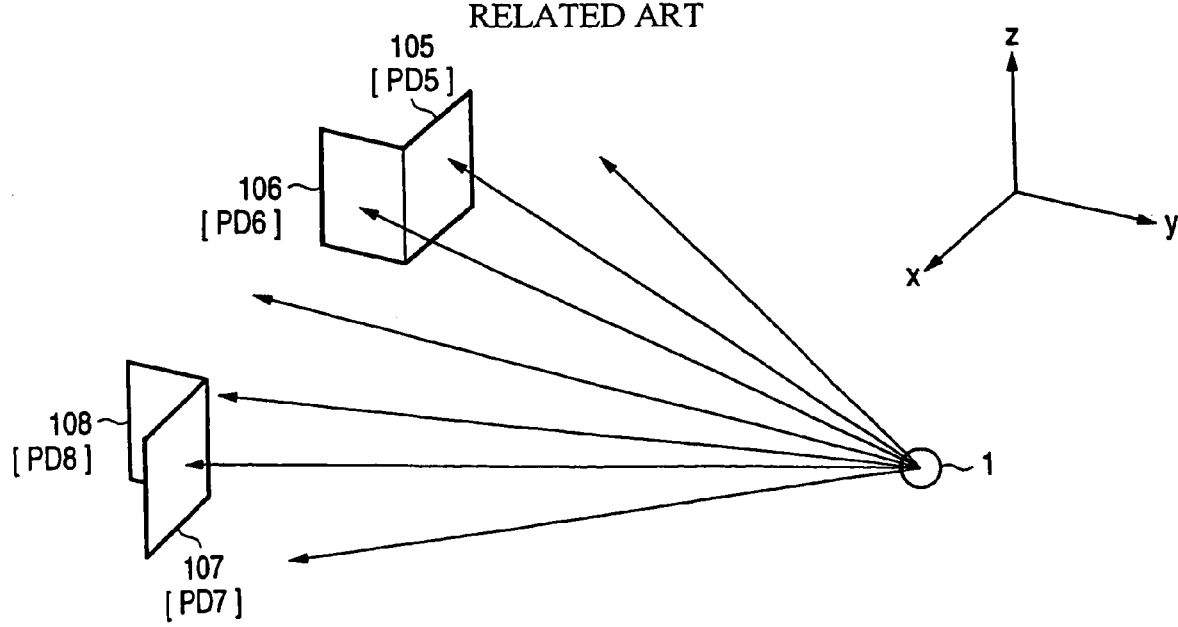
FIG. 4 is a basic constitutional diagram showing another example of a two-dimensional positional locating apparatus.
Figure 5:
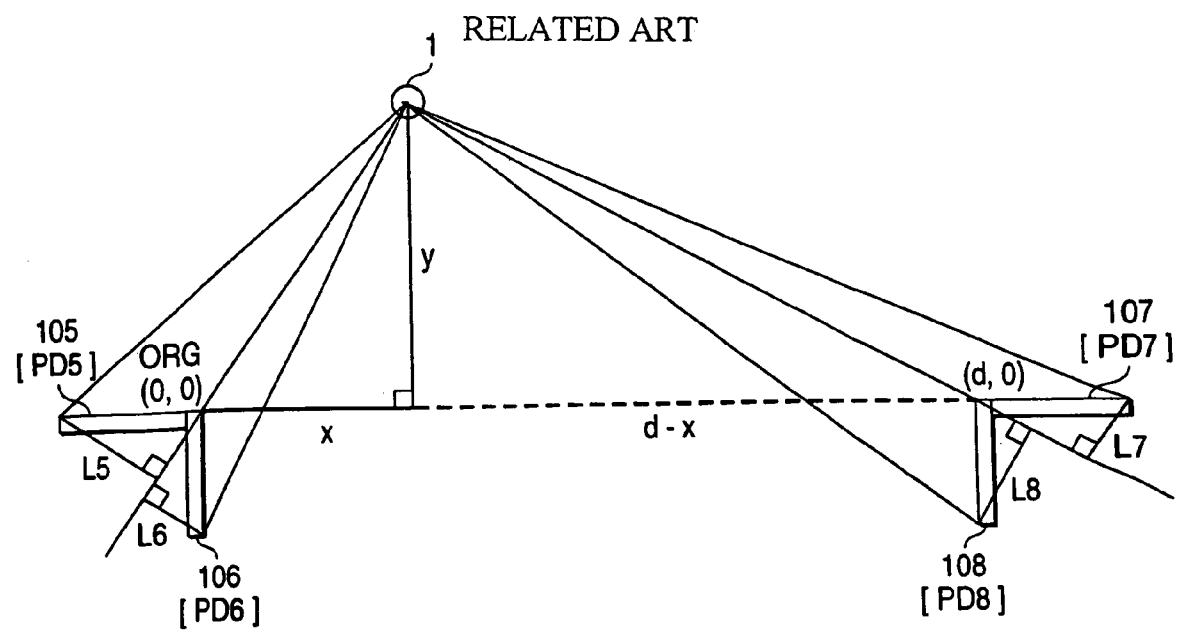
FIG. 5 is a diagram showing the measurement fundamental of the apparatus shown in FIG. 4.
Figure 6:
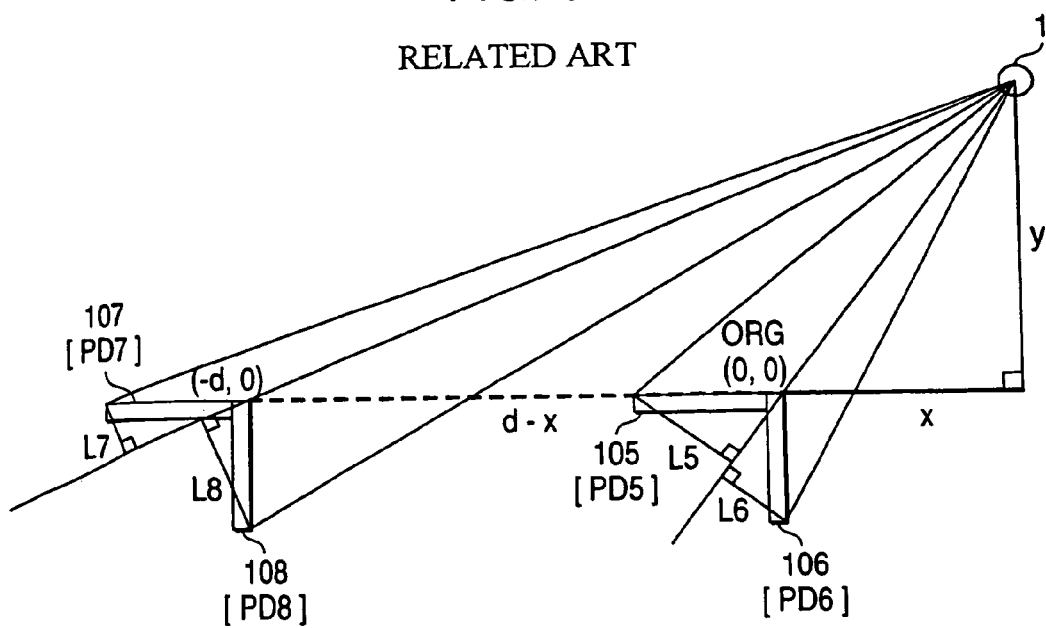
FIG. 6 is a diagram showing the measurement fundamental shown in FIG. 5 where the positions of the photodiodes are changed.

In FIGS. 4 to 6, numerals 105, 106, 107 and 108 denote PDs.

Figure 7:
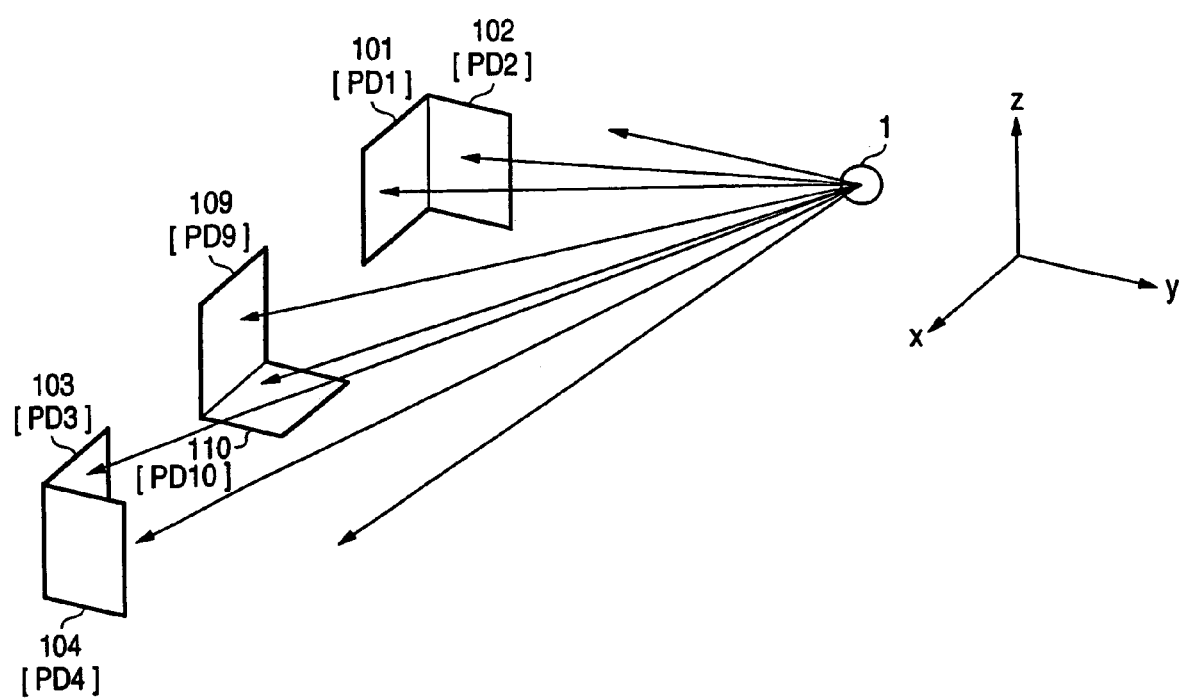
FIG. 7 is a basic constitutional diagram showing an example of a three-dimensional positional locating apparatus.

In order to obtain the three-dimensional position of the light source 1, one additional photoelectric conversion unit having PDs 109 and 110 (PD9 and PD10) is then installed as shown in FIG. 7. The position of the light source 1 on the xy plane has been obtained by PD1, PD2, PD3 and PD4, and the position thereof on the yz plane, which is perpendicular to the xy plane, is measured herein. In order for the measurement, PD9 and PD10 are arranged in perpendicular to the yz plane in such a manner that the PDs are proximate to each other to make an angle of about 90° upon viewing the yz plane from above. The intersecting point of PD9 and PD10 is arranged on the x axis. As similar to PD1, PD2, PD3 and PD4 as having been described, the two right angle triangles having the lengths L as oblique lines (those having L9 and L10 as the bottom, figures of which are omitted herein) for PD9 and PD10 are congruent to each other. These right angle triangles and the right angle triangles having segments connecting two intersecting points of PDs and the light source as oblique lines are similar to each other. The following equations (11) and (12) are derived under the conditions.

$$L10/L9 = z/y \quad (11)$$

$$L10/L9 = V10/V9 \quad (12)$$

The value of y has been obtained by the equation (7), and the following equation (13) is derived from the equations (7), (11) and (12).

$$z = (V10/V9) \cdot y \quad (13)$$
$$= d \cdot (V10/V9)/((V4/V3) + (V2/V1))$$

The three-dimensional position (x,y,z) of the light source 1 can be obtained from the outputs of the PDs by using the equations (6), (7) and (13).

Figure 8:
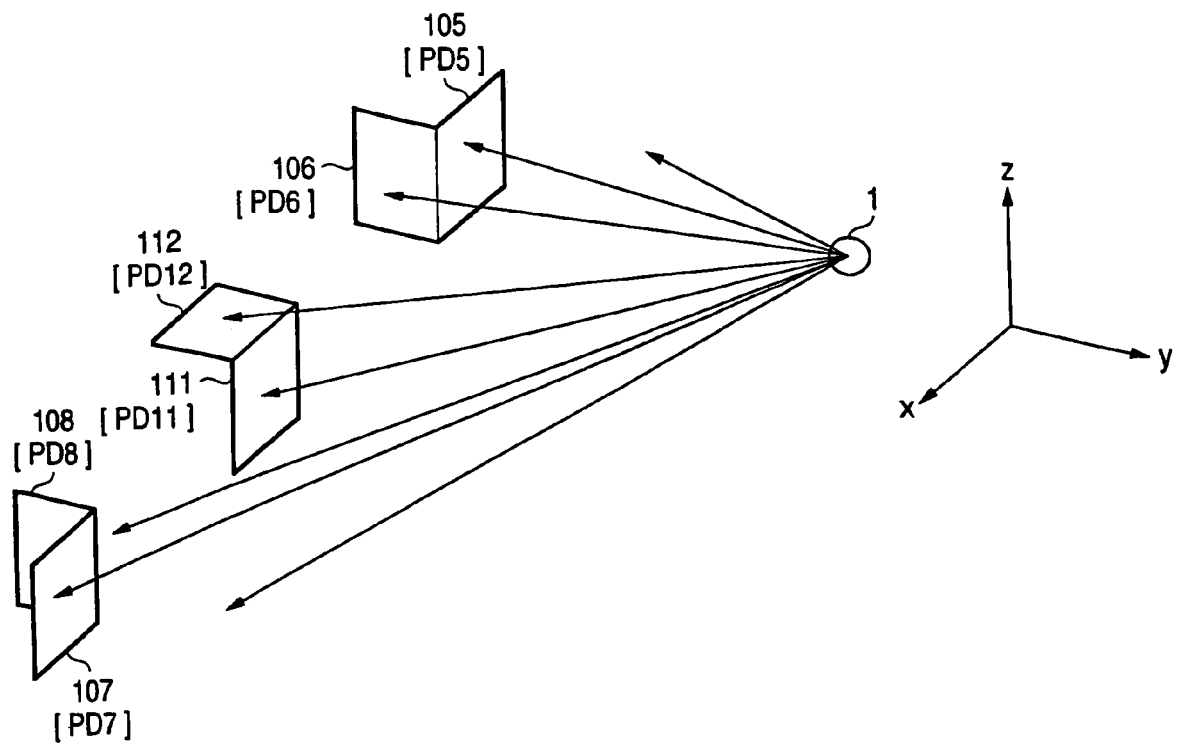
FIG. 8 is a basic constitutional diagram showing another example of a three-dimensional positional locating apparatus.

While the directions of the two PDs in the respective photoelectric conversion units are 90° with the inside toward the light source 1 as in FIG. 7, the position of the light source 1 can also be obtained based on the concept, on which the equations (8) and (10) are based, in the case where the PDs form an angle of 270°, i.e., 90° with the outside toward the light source 1 as shown in FIG. 8. In FIG. 8, numerals 111 and 112 denote PDs.

Figure 9:
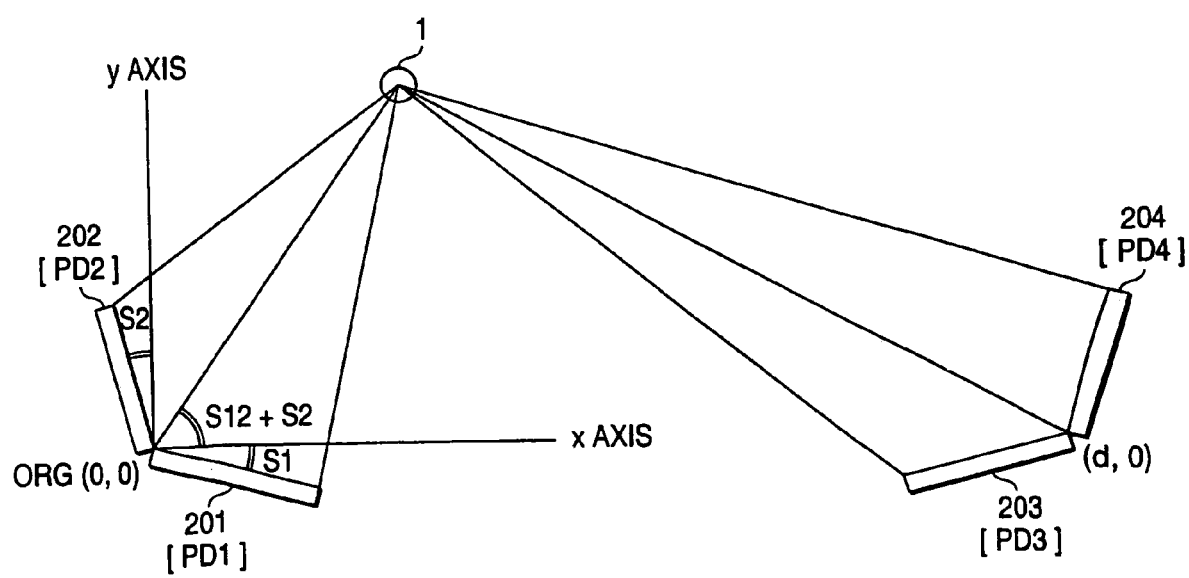
FIG. 9 is a diagram showing a case where photodiodes of photoelectric conversion units are arranged to make angles other than 90° and 270°.

As shown in FIG. 9, the position of the light source 1 when the angles of PDs (201, 202, 203 and 204) are slightly deviated from 90° is then obtained. FIG. 9 shows the case where the angles of the PDs are larger than 90°. As a representative example, the leftward photoelectric conversion unit in the example shown in FIG. 2 is calculated. The angle formed by PD1 with the x axis is represented by S1, and the angle formed by PD2 with the y axis is represented by S2, with the direction from the light source, toward which the projected area is increased, being designated as the positive direction. The angle formed by the x axis with respect to the light source is represented by S12+S2.

Figure 10:
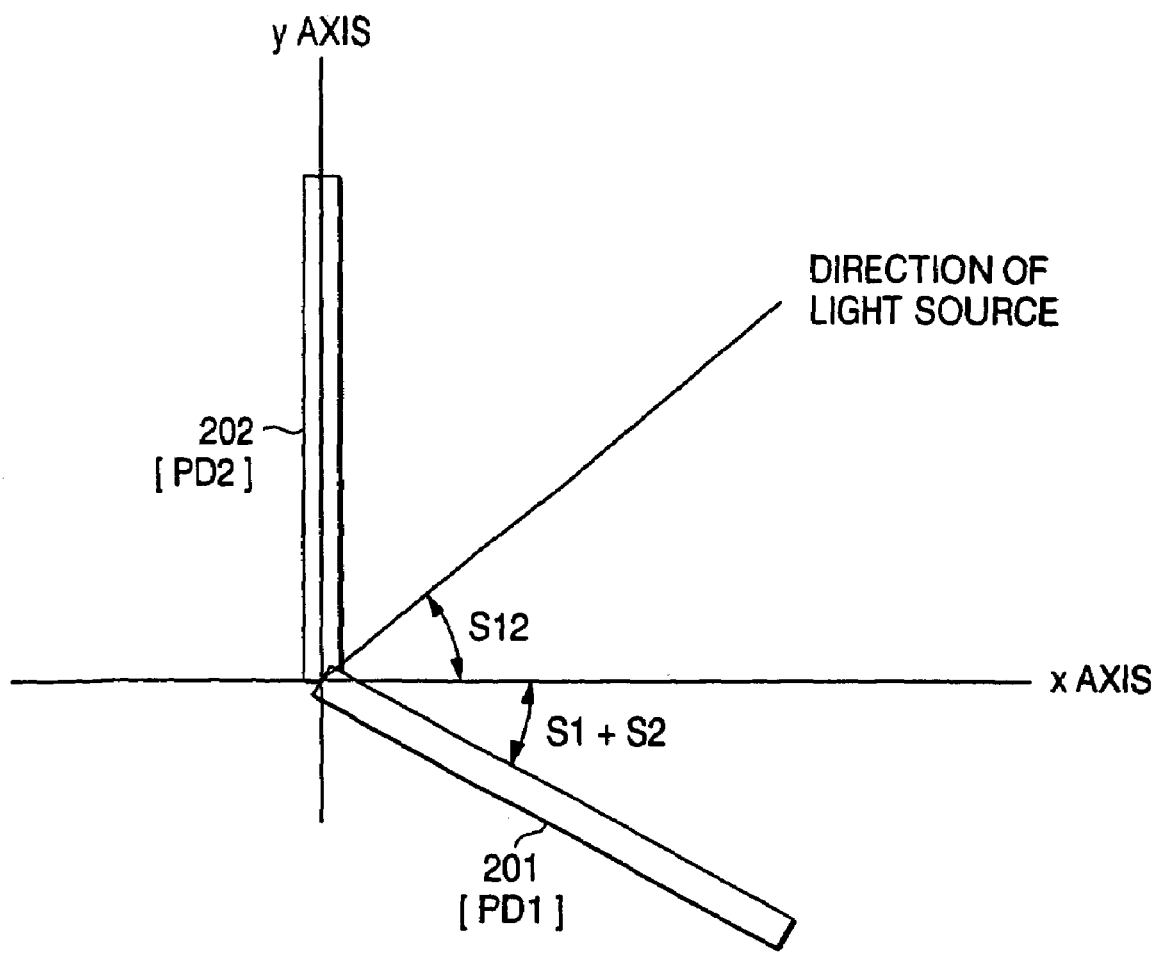
FIG. 10 is a diagram showing a calculation process of positions in the case shown in FIG. 9.

The case where all the members are rotated by S1+S2 with the origin as center as shown in FIG. 10 will be described as a first step. The following equation (14) is derived.

$$V2/V1 = L2/L1 \quad (14)$$
$$= L \cdot (\sin(90 - S12))/L \cdot (\sin(S12 + (S1 + S2)))$$
$$= \cos S12/(\sin S12 \cdot \cos(S1 + S2) + \cos S12 \cdot \sin(S1 + S2))$$
$$= 1/(\tan S12 \cdot \cos(S1 + S2) + \sin(S1 + S2))$$

The following equation (15) is derived from the equation (14).

$$\tan S12 = (V2/V1 - \sin(S1 + S2))/\cos(S1 + S2) \quad (15)$$
$$= (V2/V1)/\cos(S1 + S2) - \tan(S1 + S2)$$

The following equation (16) is derived from the equation (15).

$$S12 = a\tan((V2/V1)/\cos(S1+S2) - \tan(S1+S2)) \quad (16)$$

Figure 11:
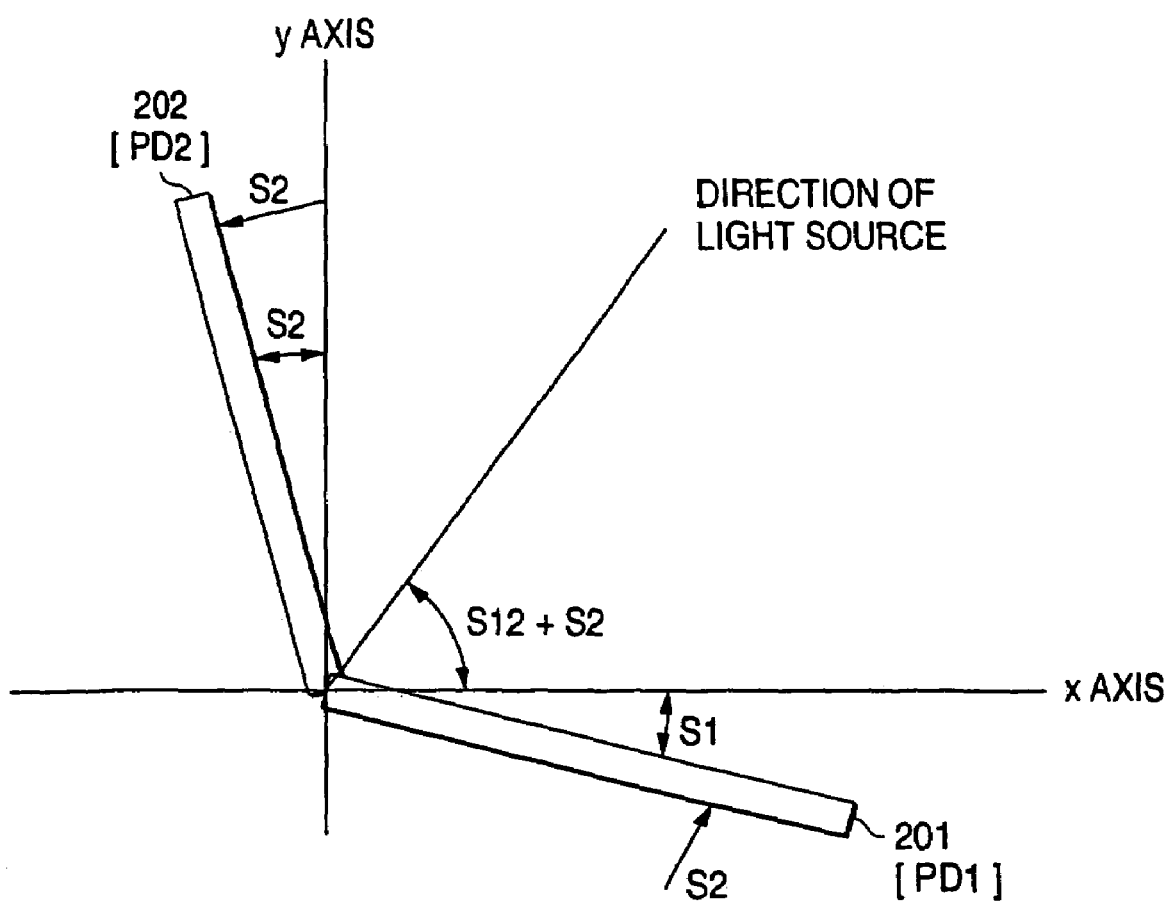
FIG. 11 is another diagram showing a calculation process of positions in the case shown in FIG. 9.

As a second step, PD1 and PD2 in the first step are rotated by S2 as shown in FIG. 11, the target state is obtained where PD1 forms the angle S1 with the x axis, and PD2 forms the angle S2 with the y axis. In this state, the angle S12+S2 formed by the x axis with respect to the light source can be expressed by the following equation (17) derived from the equation (16).

$$S12+S2 = a\tan((V2/V1)/\cos((S1+S2) - \tan(S1+S2)) + S2 \quad (17)$$

The value tan(S12+S2) can be expressed by the following equation (18) derived from the equation (17).

$$\tan(S12 + S2) = \tan(a\tan((V2/V1)/\cos(S1 + S2) - \quad (18)$$
$$\tan(S1 + S2)) + S2)$$
$$= (V1/V2 - \sin(S1 + S2) +$$
$$\cos(S1 + S2) \cdot \tan S2))/$$
$$(\cos(S1 + S2) - (V1/V2) \cdot \tan S2 +$$
$$\sin(S1 + S2) \cdot \tan S2))$$

When the angle formed by the x axis with respect to the light source in PD3 and PD4 is represented by S34+S4, the following equation (19) can be similarly obtained.

$$\tan(S34 + S4) = \tan(a\tan((V4/V3)/\cos(S3 + S4) - \quad (19)$$
$$\tan(S3 + S4)) + S4)$$
$$= (V3/V4 - \sin(S3 + S4) +$$
$$\cos(S3 + S4) \cdot \tan S4)/(\cos(S3 + S4) -$$
$$(V3/V4) \cdot \tan S4 + \sin(S3 + S4) \cdot \tan S4)$$

The values tan(S12+S2) and tan(S34+S4) in the equations (18) and (19) correspond to the angles of the straight lines starting from the intersecting points of the two PDs in the respective photoelectric conversion units toward the light source. In other words, these values correspond to V1/V2 and V3/V4 in the equations (6) and (7) where the angles formed by the PDs in the respective photoelectric conversion units are 90°. Accordingly, the following equations (20) and (21) are obtained by substituting the equations (18) and (19) for the equations (6) and (7).

$$x = d \cdot ((\cos(S1 + S2) - (V1/V2) \cdot \tan S2 + \sin(S1 + S2) \cdot \tan S2)/ \quad (20)$$
$$(V1/V2 - \sin(S1 + S2) + \cos(S1 + S2) \cdot \tan S2))/$$
$$((\cos(S1 + S2) - (V1/V2) \cdot \tan S2 + \sin(S1 + S2) \cdot \tan S2)/$$
$$(V1/V2 - \sin(S1 + S2) + \cos(S1 + S2) \cdot \tan S2) +$$
$$(\cos(S3 + S4) - (V3/V4) \cdot \tan S4 + \sin(S3 + S4) \cdot \tan S4)/$$
$$(V3/V4 - \sin(S3 + S4) + \cos(S3 + S4) \cdot \tan S4))$$

$$y = d/((\cos(S1 + S2) - (V1/V2) \cdot \tan S2 + \sin(S1 + S2) \cdot \tan S2)/ \quad (21)$$
$$(V1/V2 - \sin(S1 + S2) + \cos(S1 + S2) \cdot \tan S2) +$$
$$(\cos(S3 + S4) - (V3/V4) \cdot \tan S4 + \sin(S3 + S4) \cdot \tan S4)/$$
$$(V3/V4 - \sin(S3 + S4) + \cos(S3 + S4) \cdot \tan(S4)))$$

As described in the foregoing, the coordinate of the light source 1 can be obtained by using the outputs and angles of the PDs even in the case where the angles formed by the PDs of the respective photoelectric conversion units are larger than 90°. In the case where the angles are smaller than 90°, the coordinate of the light source can also be obtained similarly by using the equations (20) and (21) where the values of S1, S2, S3 and S4 are negative. Furthermore, the position of the light source 1 can also be obtained based on the concept of the equations (8) to (10) in the case where two photoelectric conversion units are arranged on the same side with respect to the light source as shown in FIG. 3, the case where the PDs in the respective photoelectric conversion units are folded outwardly as shown in FIG. 4, and the case of the three-dimensional position locating as shown in FIG. 7.

Figure 12:
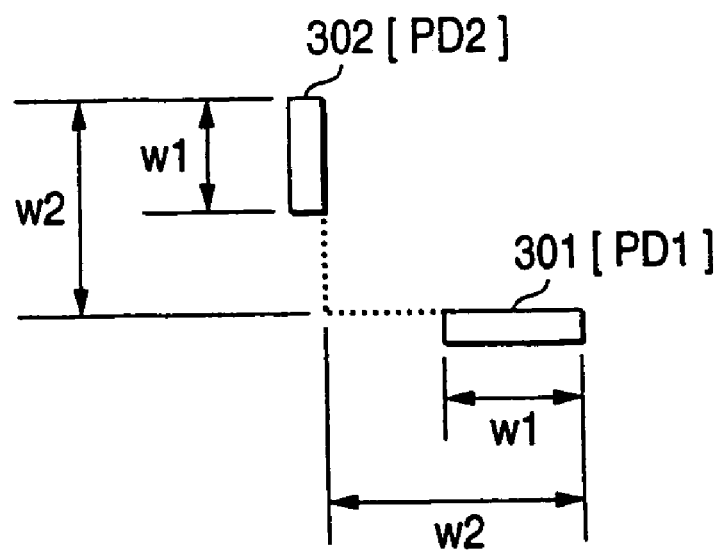
FIG. 12 is a diagram showing a case where photodiode elements of a photoelectric conversion unit are not in contact with each other.
Figure 13:
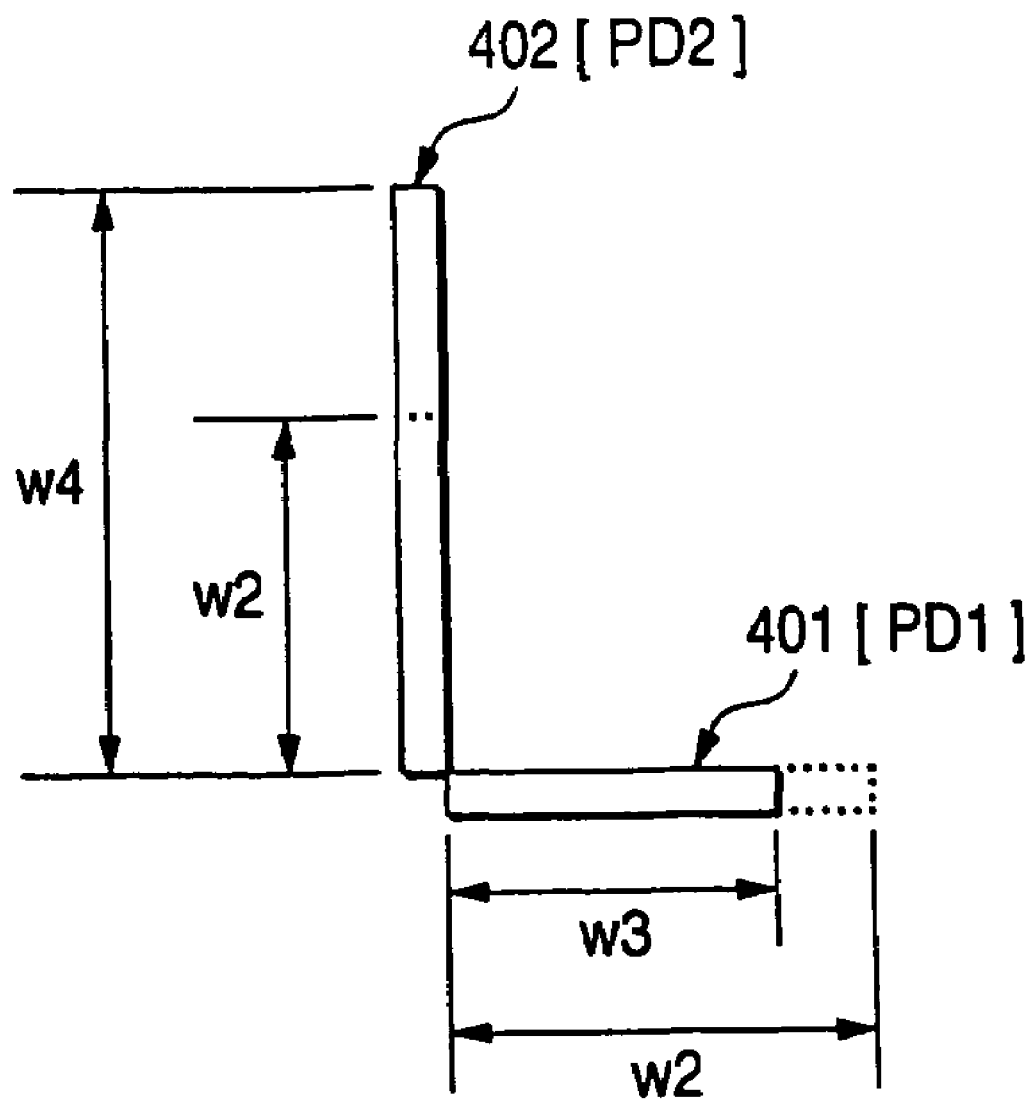
FIG. 13 is a diagram showing a case where photodiode elements of a photoelectric conversion unit have length different from each other.

In the actual apparatus using PDs, it is general that the PD elements are not arranged on the whole surface of the chassis. Therefore, it is infrequent that the PD elements are in contact with each other as shown in FIGS. 1 to 8, and as shown in FIG. 12, PDs (301 and 302) in one photoelectric conversion unit are present apart from each other without contact. The compensation method in this case will be described. In the case where the lengths of the PDs are the same as each other, no compensation is required. In the case where the areas of the PDs are different from each other, the output is multiplied by a proportionality factor obtained by assuming that the two PDs have the same areas. For example, in the case shown in FIG. 13 for simplicity, PDs (401 and 402) having rectangular shapes are assumed, the lengths of which in the direction perpendicular to the paper plane are the same as each other. In this case where the lengths of the PDs are w3 and w4, respectively, which are different from each other, the output of the PD having the length w3 is multiplied by w4/w3.

(First Embodiment)

Figure 14:
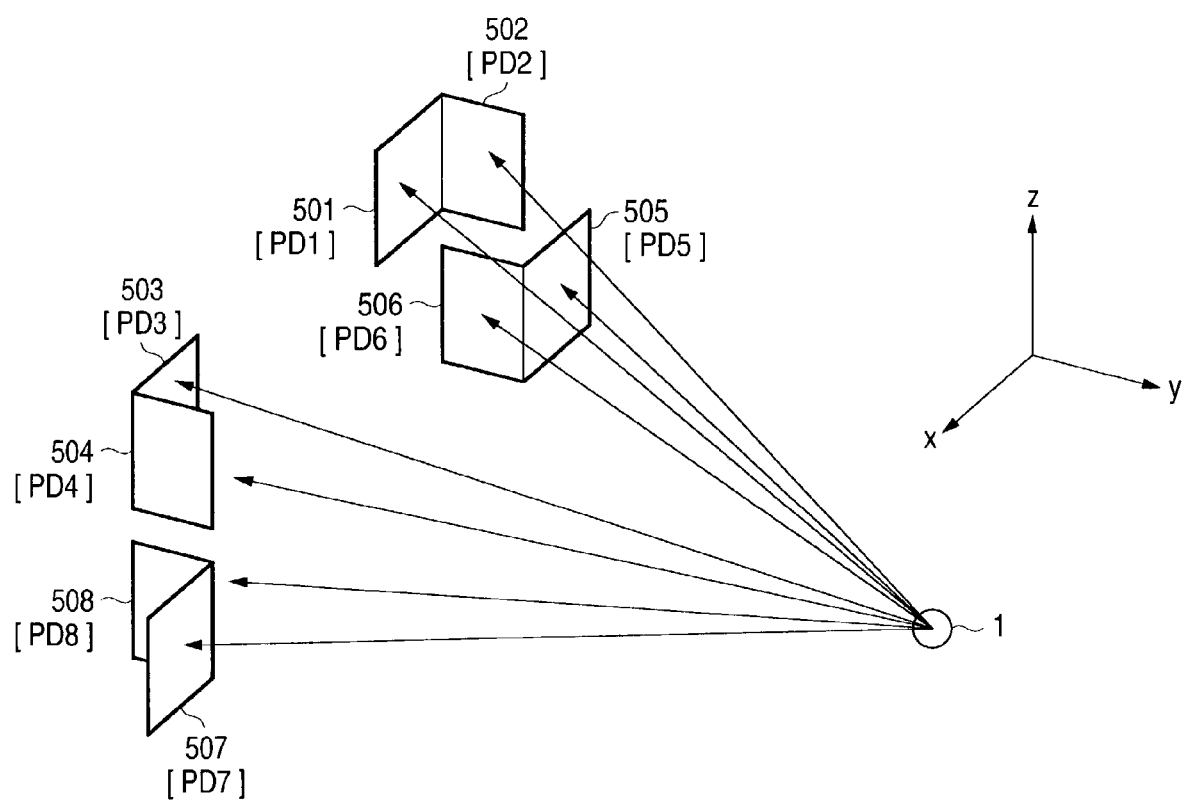
FIG. 14 is a constitutional diagram showing a two-dimensional positional locating apparatus of a first embodiment of the invention.

The first embodiment will be described with reference to FIG. 14. In FIG. 14, the number of PDs (501 and 502, 503 and 504, 505 and 506, and 507 and 508) per one photoelectric conversion unit is four, and the PDs are proximate to each other to form a constitution of the combination of the constitutions shown in FIGS. 1 and 4. That is, one pair of PD501 and 502 of one photoelectric conversion unit have light receiving surfaces arranged inwardly to make valley fold with respect to the light source 1, and the other pair of PD505 and PD506 have light receiving surfaces arranged outwardly to make mountain fold with respect to the light source 1. Similarly, in the other photoelectric conversion unit, one pair of PD503 and 504 have light receiving surfaces arranged inwardly to make valley fold with respect to the light source 1, and the other pair of PD507 and PD508 have light receiving surfaces arranged outwardly to make mountain fold with respect to the light source 1. The reason why the constitution is employed will be described below.

The equations (1) to (7) are geometrically correct in FIG. 1, but there is a problem that the optical density irradiated on L1 and that on L2 are different from each other. This is because the distances from the light source 1 to L1 and L2 are different from each other, i.e., L2 is nearer that L1, and thus the optical density reaching L2 is larger than the optical density reaching L1. Therefore, in the equation (3) (L2/L1= V2/V1), the right side member is larger than the left side member.

In the constitution shown in FIG. 4 where the two PDs proximate to each other in one photoelectric conversion unit are folded outwardly, on the other hand, L2 is farther than L1 from the light source, and the optical density reaching L2 is smaller than the optical density reaching L1. Therefore, in the equation (3) (L2/L1=V2/V1), the right side member is smaller than the left side member.

Figure 16:
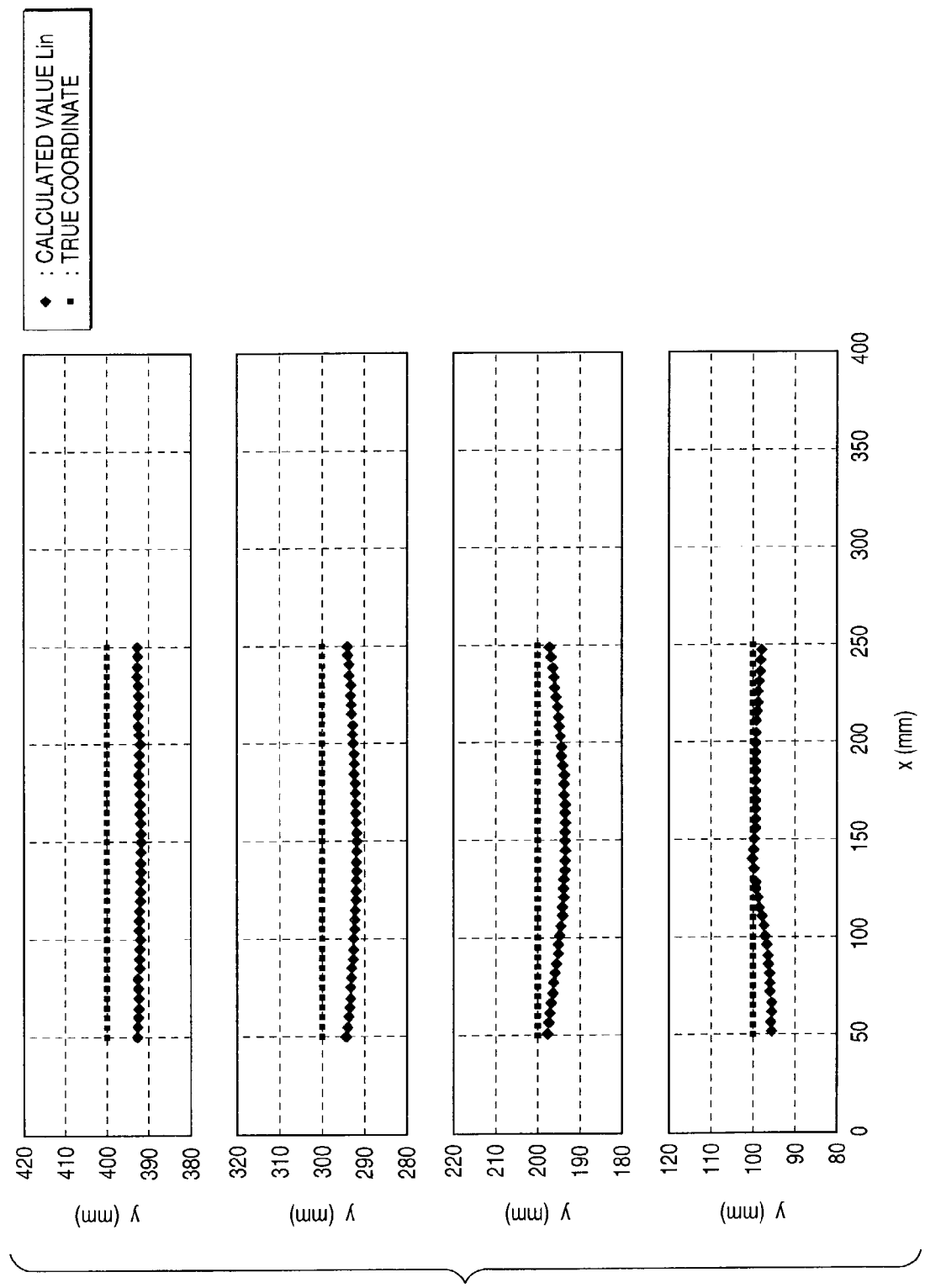
FIG. 16 is a diagram showing measurement results in FIG. 1.
Figure 25:
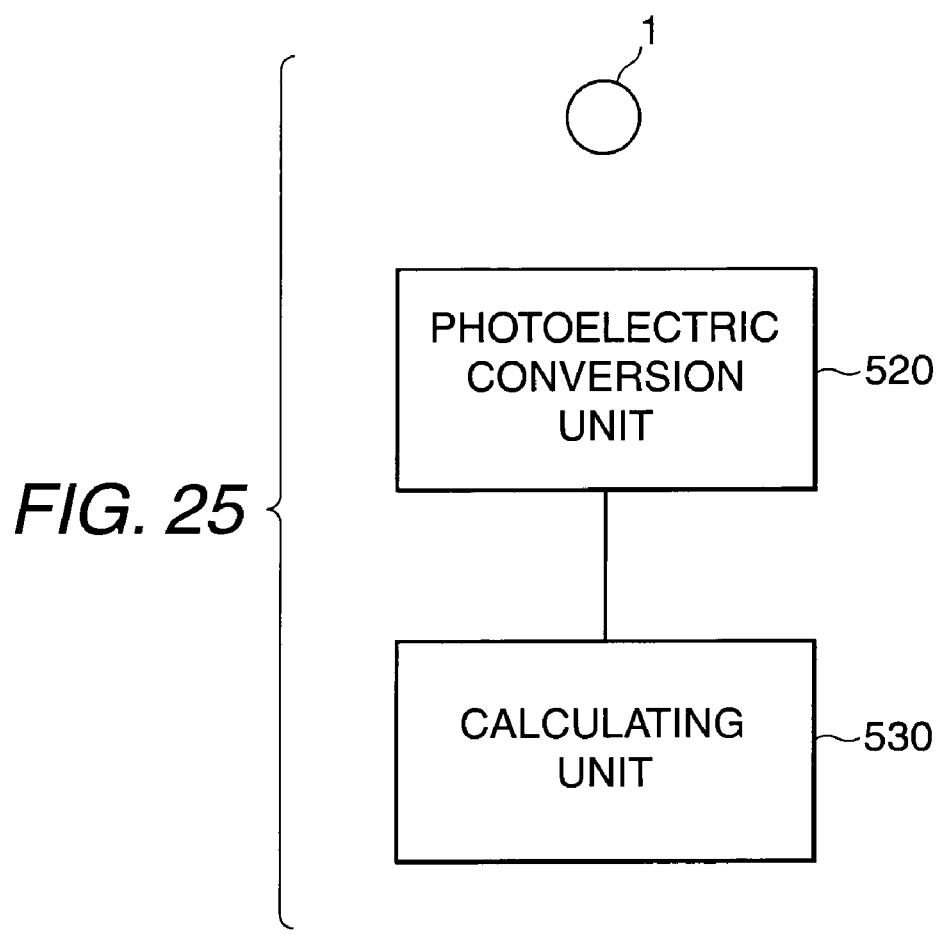
FIG. 25 is a block diagram of various embodiments of the invention.

The invention uses such a system that the position of the light source is obtained based on the output ratio of two PDs, and therefore, there definitely occurs an error due to the difference in optical densities irradiated on the two PDs. According to the results of calculation by simulation in the constitution of PDs in FIG. 1 as shown in FIG. 16, the calculation result is deviated from the true position of the light source by about 8 mm at the maximum in the y direction approaching the light source. The calculations are performed by the calculating unit 530 which receives the output from each of the photoelectric conversion surfaces which form the photoelectric conversion unit 520, as shown in FIG. 25. It should be understood by one of ordinary skill in the art that the photoelectric conversion unit 520 of FIG. 25 may be any arrangement of photoelectric conversion surfaces or photodiodes according to the principles of the invention.

Figure 17:
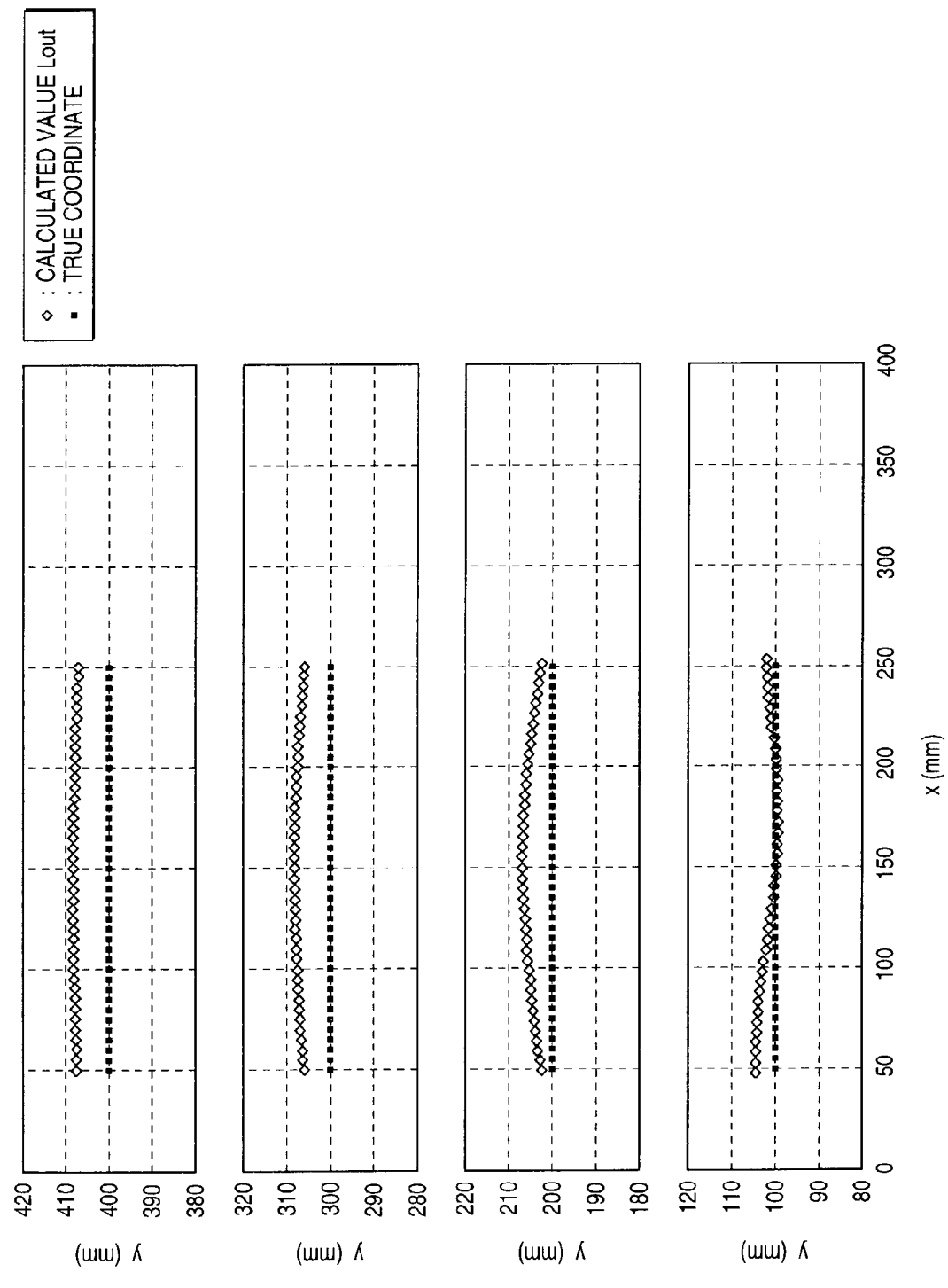
FIG. 17 is a diagram showing measurement results in FIG. 4.

On the other hand, according to the results of calculation by simulation in the constitution of PDs in FIG. 4 as shown in FIG. 17, the calculation result is deviated from the true position of the light source by about 8 mm at the maximum in the y direction backing away from the light source.

Figure 18:
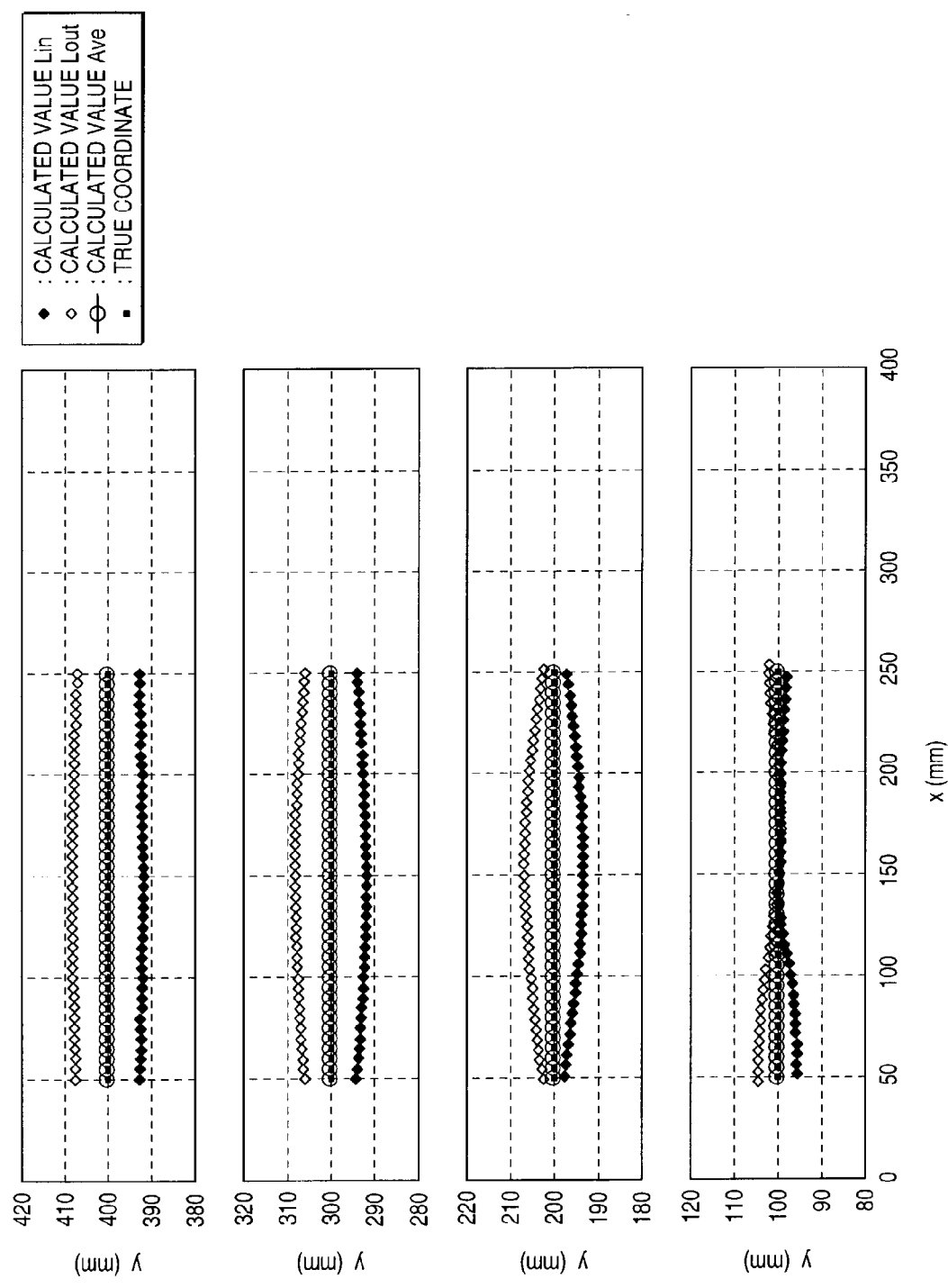
FIG. 18 is a diagram showing measurement results in the first and second embodiments.

In order to compensate the errors caused by the factors, it is considered that the constitution of PDs in FIG. 1 is combined with that in FIG. 4. For example, the constitution shown in FIG. 14 is considered, which is a simple combination of FIGS. 1 and 4. This is a simple combination of the two constitutions shown in the figures, and the positions of the origins in the figures are different from each other. Therefore, the positions of the light source are determined taking the difference into consideration, and then the position of the light source with small error is finally obtained, for example, by averaging the positions of the light source thus obtained. The calculation results in this case shown in FIG. 18 exhibit an extremely small error of 0.2 mm at the maximum, and the error is improved by 1/40 of those in FIGS. 16 and 17. While the angles formed by the respective PDs herein are 90° and 270°, i.e., S1 and S2 are 0°, the maximum error can also be minimized to 0.2 mm by using the compensating equations (20) and (21) in the case where the angles are changed as in FIG. 9.

By using outputs only from a set of the mountain fold PD pair (501,502) and the valley fold pair (505,506), a location or a distance in one-dimension or a angle of elevation to the light source 1 from the photoelectric conversion unit can be measured, with compensating the error caused from the arrangement of photoelectric conversion surfaces.

(Second Embodiment)

Figure 15:
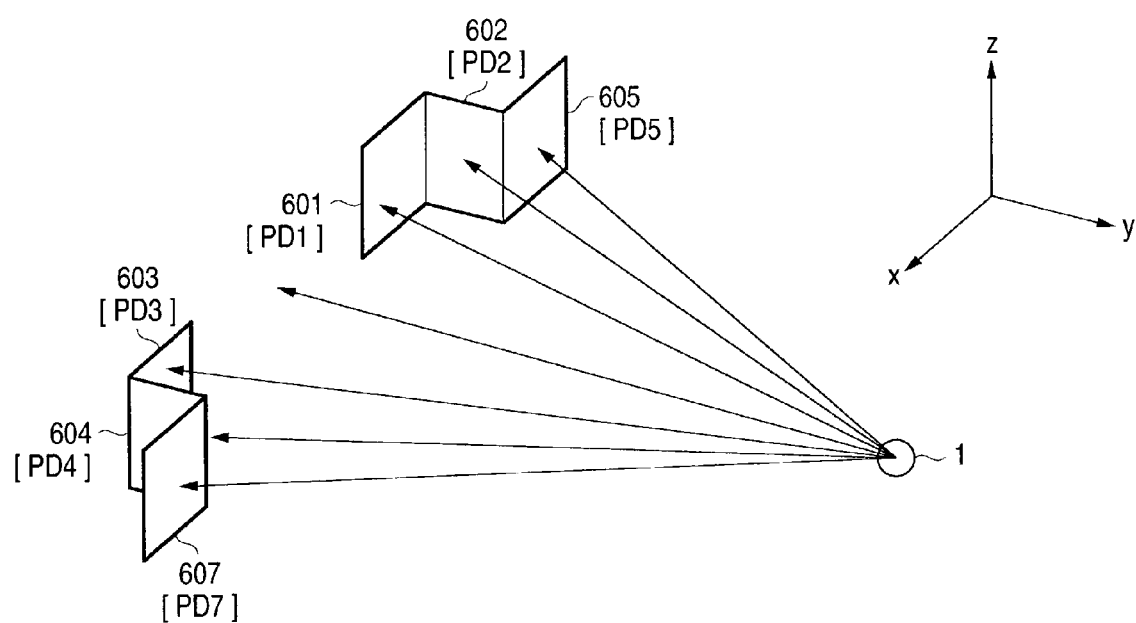
FIG. 15 is a constitutional diagram showing a two-dimensional positional locating apparatus of a second embodiment of the invention.

In the second embodiment shown in FIG. 15, it is possible that part of the PDs in the constitution in FIG. 14 are shared by the pairs thereof. In FIG. 15, the number of PDs (601, 602 and 605, and 603, 604 and 607) per one photoelectric conversion unit is three, and the three PDs are proximate to each other to form angles within the PDs of 90° or 270°. In other words, the constitution is obtained by combining a pair of PDs forming an angle of 90° and a pair of PDs forming an angle of 270°.

The three-dimensional position of the light source 1 measured by using the PDs forming an angle of 90° and the three-dimensional position of the light source 1 measured by using the PDs forming an angle of 270° are obtained, and the measured values are averaged to obtain the three-dimensional position of the light source 1. The equations (6), (7) and (13) are used for the measurement. In the case where the angles formed by the PDs are those other than 90° and 270°, the equations (20) and (21) are used for the measurement. While FIG. 15 shows an example where PD2 is shared as PD2 and PD6, and PD4 is shared as PD4 and PD8, it is also possible that PD1 is shared as PD1 and PD5, and PD3 is shared as PD3 and PD7.

While FIGS. 14 and 15 show the combinations of FIGS. 1 and 4, the same can be applied to combinations of FIGS. 3 and 6. Figures showing the later combinations are omitted herein.

While the examples of two-dimensional position locating are shown herein for simplicity, the same constitutions can be applied to the three-dimensional position locating as shown in FIGS. 7 and 8. Figures showing the later constitutions are omitted herein.

Besides calculating a location or direction directly, the indirect value containing information with regard to a location of or a direction to the diffused light source may be calculated by using the outputs of photoelectric conversion surfaces, by digital or analog calculation, for controlling any device (such as a pointer on a PC monitor).

(Third Embodiment)

Figure 19:
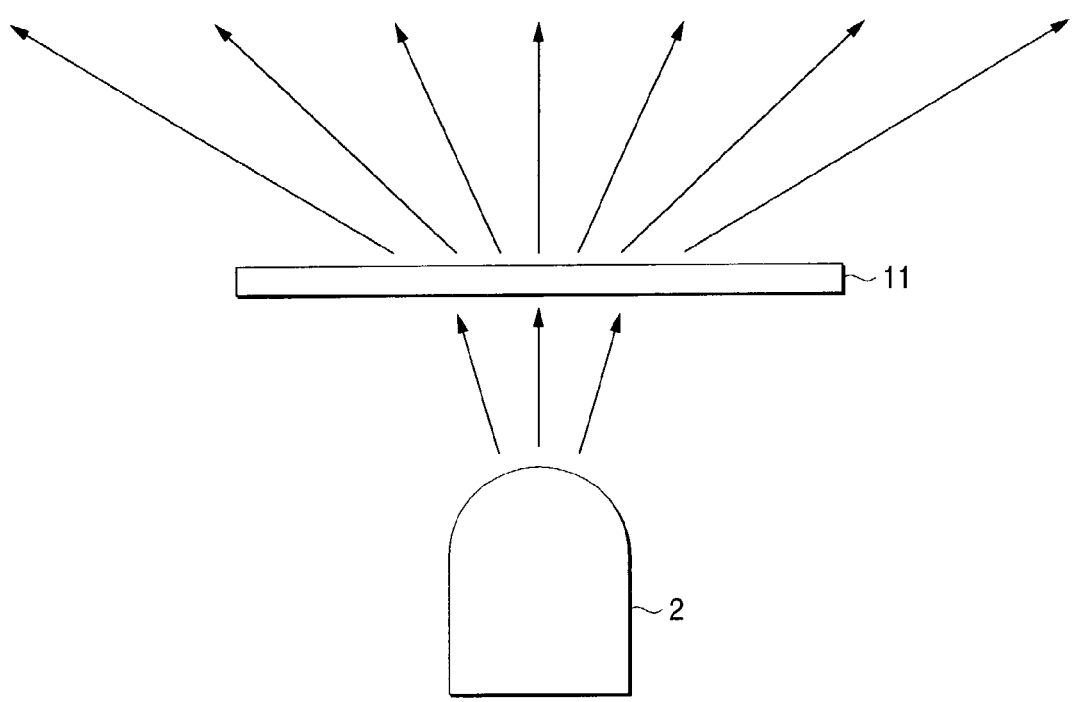
FIG. 19 is a diagram showing a constitutional example of a light source in a third embodiment of the invention.
Figure 20:
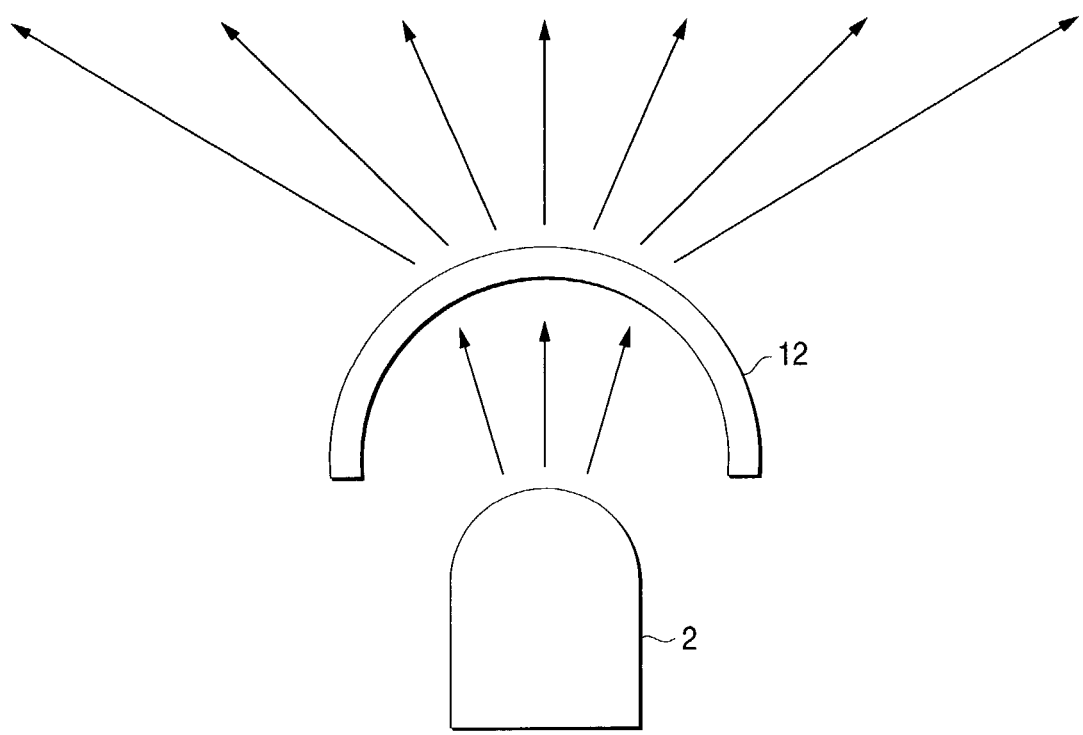
FIG. 20 is a diagram showing a modified constitution of the light source shown in FIG. 19.

The third embodiment will be described with reference to FIGS. 19 and 20. The light source 1 shown in FIG. 19 is constituted with an LED 2 and a diffusion plate 11. Upon receiving light from the light source 1 by the PDs in the invention, it is preferred that there is no deviation in light amount distribution. When there is a large deviation, there is a difference in optical density between the two PDs in one photoelectric conversion unit having light incident thereon to cause an erroneous output ratio of the two PDs, and as a result, accurate locating of the position of the light source cannot be carried out. Therefore, it is preferred that a diffusion plate 11 having a high transmission efficiency capable of exerting uniform diffusion, such as LSD (produced by NABA Corporation), is arranged in front of the LED 2. LSD is a film having, on the surface thereof, unevenness that has a function of microlenses, and it maintains high transmission efficiency of 80% or more without reduction in transmission efficiency occurring in films containing pigments dispersed therein. FIG. 20 shows an example where the diffusion plate 12 is used after bending, which is an effective measure for emitting light of a uniform optical density within a broader range. Various kinds of lamps can be used as the light source instead of an LED. As the diffusion plate, a film having particular molecules dispersed therein and a film having a surface roughly polished may also be used instead of LSD. The measure for emitting light of a uniform optical density may be surface treatment of the light emitting element, such as an LED, instead of the additional use of the films.

(Fourth Embodiment)

Figure 21:
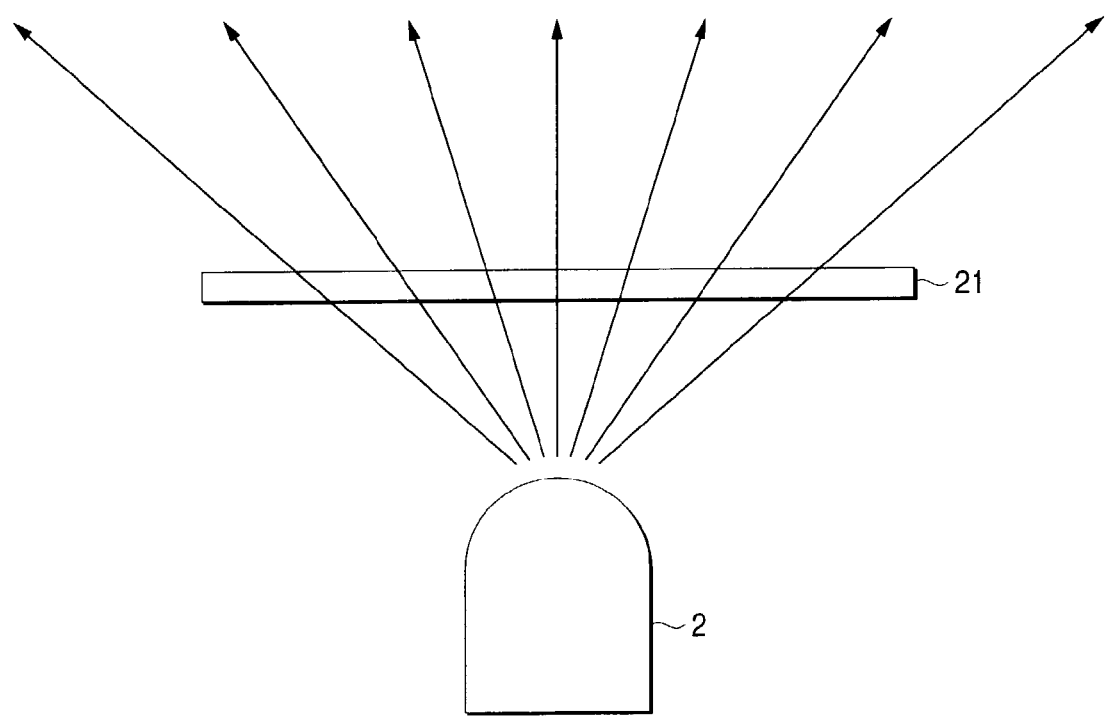
FIG. 21 is a diagram describing a fourth embodiment of the invention.
Figure 22:
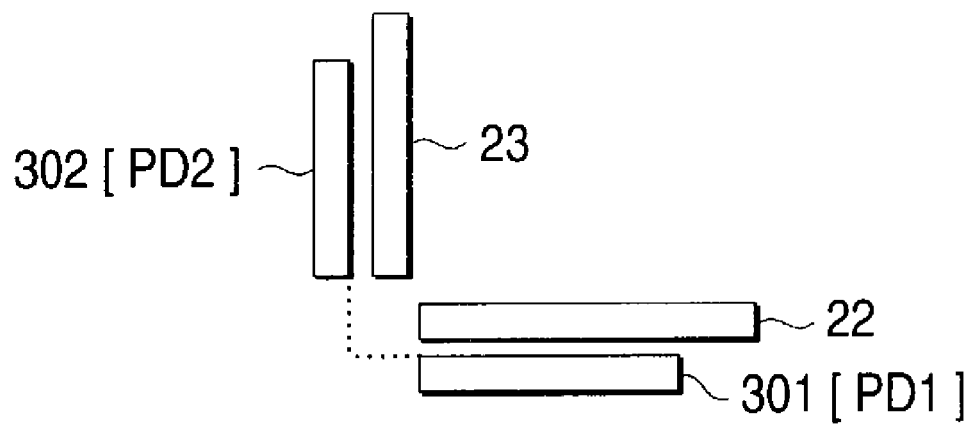
FIG. 22 is a diagram further describing the fourth embodiment of the invention.

The fourth embodiment will be described with reference to FIGS. 21 and 22. FIG. 21 shows a method for removing disturbance light. An optical filter 21 that selectively transmits light of a particular wavelength is installed between the respective PDs and the light source 1. The installation location thereof may be either the vicinity of the light source 1 shown in FIG. 21 or the vicinities of the PDs as optical filters 22 and 23 shown in FIG. 22. The photoelectric conversion unit shown in FIG. 22 is made up based on that shown in FIG. 12. An LED is preferably used as the light source owing to the easiness in wavelength selection. The wavelength is preferably in the infrared region rather than the visible region, but light having a wavelength in the other regions may be used. Particularly, in the case where plural light sources are provided and are to be discriminated among each other, it is effective that the wavelengths of the light sources are selected from a broad range of wavelength but not limited to the infrared range.

(Fifth Embodiment)

The fifth embodiment will be described below. In order to remove disturbance light, the light source preferably emits light intermittently. The output obtained from the PD in the state where the light source is off is subtracted from the output in the state where the light source is on, whereby the influence of disturbance light can be removed from the output of the PD to be obtained. While figures showing the example are omitted herein, the constitution of the circuit for removing disturbance light by intermittent light emission may be the ordinary circuit constitutions described, for example, in "Transistor Gijutu" (Transistor Technology), August of 1990, p. 475.

(Sixth Embodiment)

Figure 23:
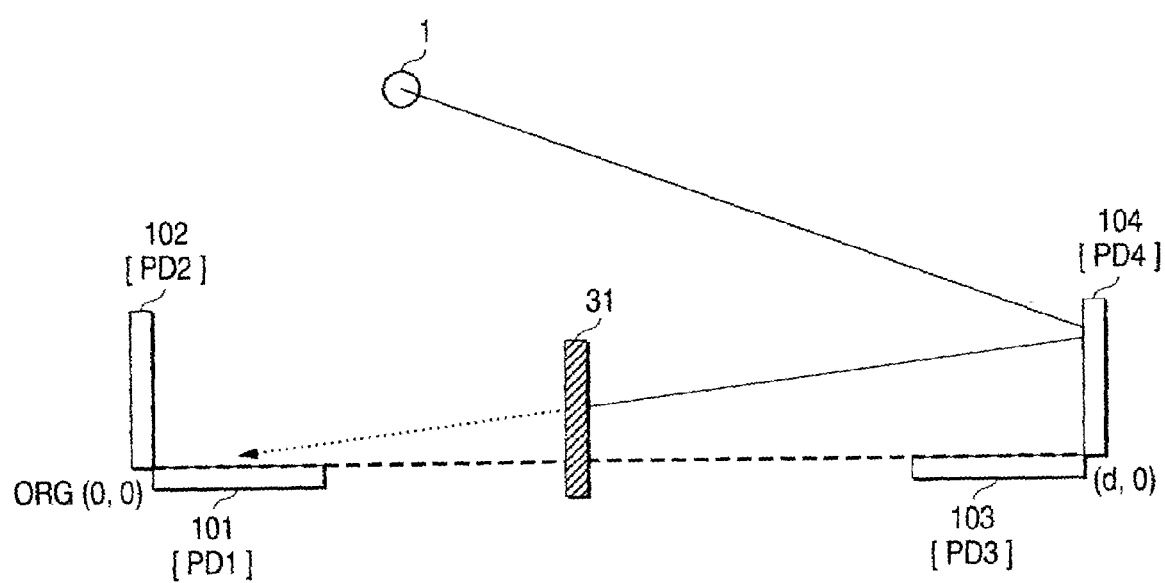
FIG. 23 is a diagram describing a sixth embodiment of the invention.

The sixth embodiment will be described with reference to FIG. 23. An example where a light shielding plate 31 is provided is shown in FIG. 23, by which such a measurement error is prevented from occurring when light reflected by the surface of PD of one photoelectric conversion unit comes into the surface of PD of the other photoelectric conversion unit. In the case where reflected light between the PDs in one photoelectric conversion unit is incident on the PDs, a light shielding plate shielding that light may be similarly provided. Figures showing the later constitution are omitted herein.

(Seventh Embodiment)

Seventh embodiment will be described below. A supporting member for the light source may have any shape, and in the case where the system is used in office environments, it is preferred that light sources are installed in plural locations of a pen-like member, by which the position and the inclination angle of the whole pen and the position of the pen point can be measured. It is possible that light sources $1^{(a)} \ldots 1^{(a)}$ are installed in plural locations (FIG. 26), and the positions thereof are measured by sequentially turning on the light sources, whereby the position of the pen point is calculated. It is also possible that plural light sources are attached to the back of the hand and the fingers, whereby the cursor position is operated by the position of the light source on the back of the hand, and input operations, such as left button click and right button click, are expressed by the relative positions and the variations thereof between the light source on the back of the hand and the light sources on the fingers upon moving the fingers.

(Eighth Embodiment)

Figure 26:
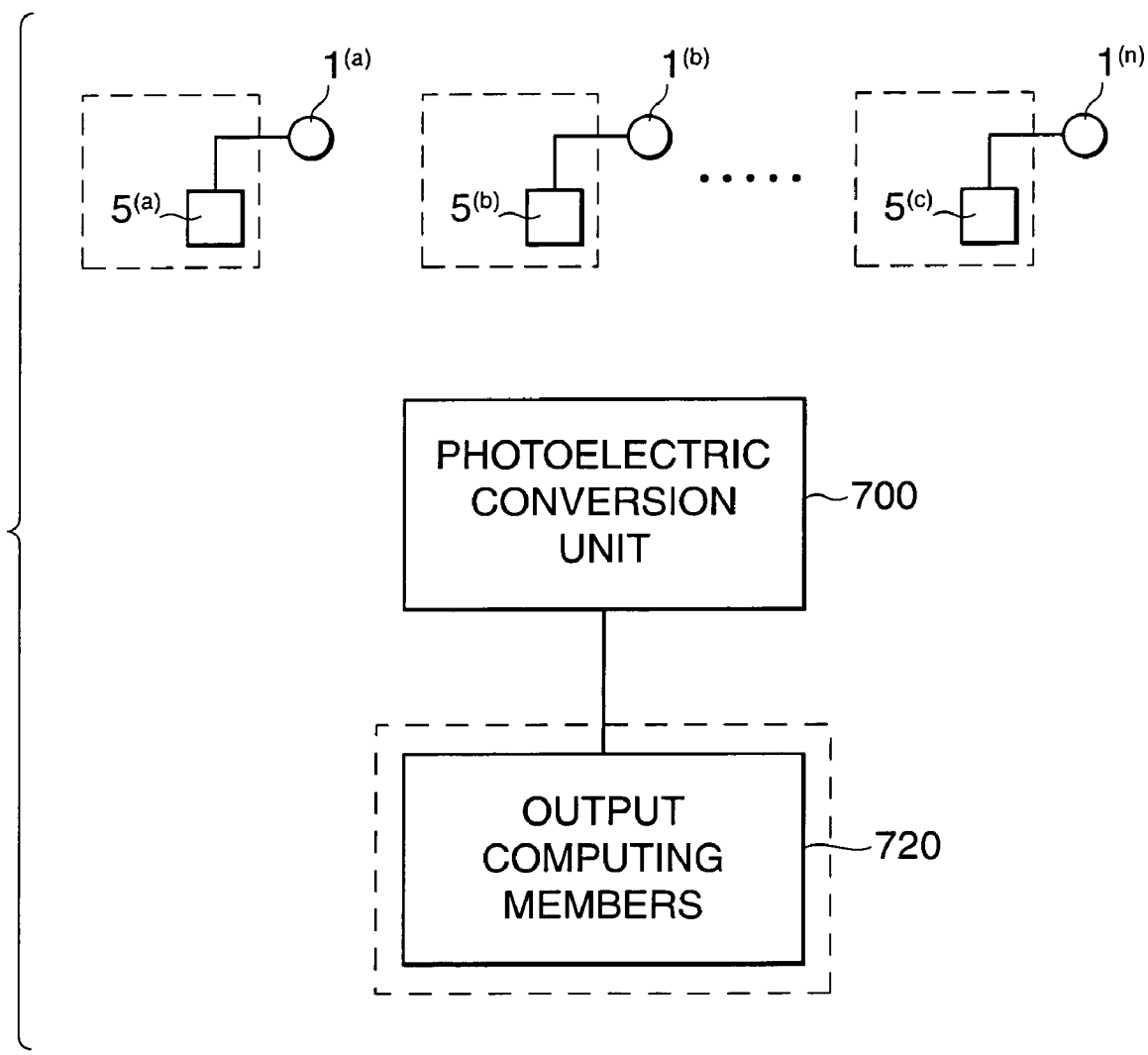
FIG. 26 is a diagram illustrating various features of the exemplary embodiment of the invention.

The eighth embodiment will be described below. Upon expressing input operations, such as left button click and right button click, it is preferred that a switch $5^{(a)}$ is provided in the vicinity of the light source (FIG. 26). Furthermore, such an operation becomes possible that the cursor is fixed when the switch is not pressed, but the cursor is started to be moved when the switch is pressed. The operation is similar to the operation of a mouse that is generally used, in which the cursor is fixed when the mouse is not touched, but the cursor is moved when the mouse is touched or intentionally moved. It is also preferred that not only the movement of the cursor but also particular operation or status is activated by pressing the switch.

(Ninth Embodiment)

Figure 24:
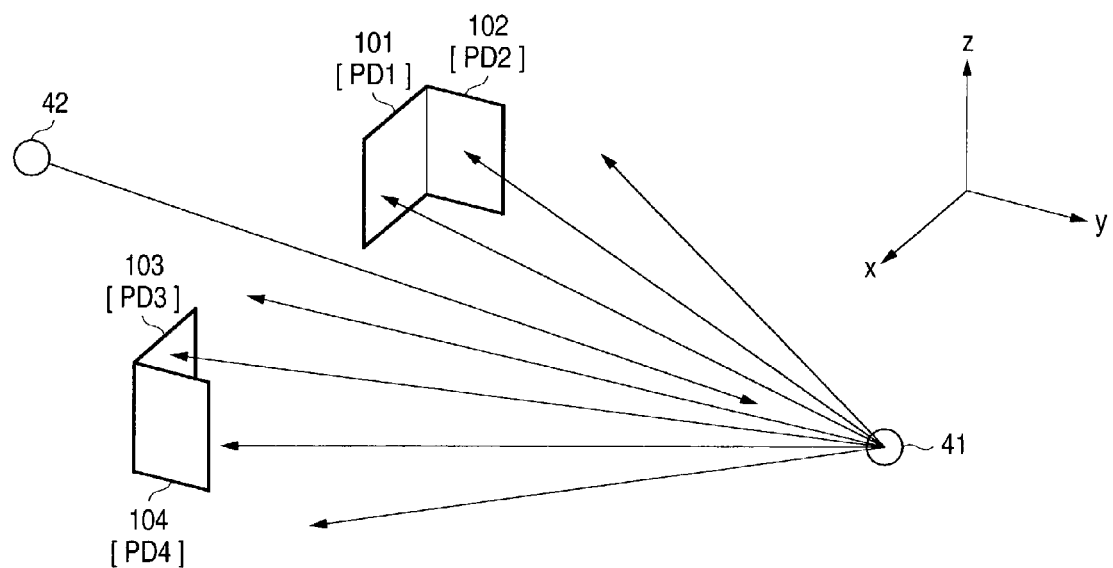
FIG. 24 is a diagram describing a ninth embodiment of the invention.

The ninth embodiment will be described with reference to FIG. 24. In the constitution shown in FIG. 24, the light source is replaced by a reflecting member 41, and a light source 42 irradiating the reflecting member is separately provided. While the reflecting member irradiated with the light source for irradiating the reflecting member is used instead of the light sources used in the constitutions shown in FIGS. 1 to 23, the position of the reflecting member can be located by using the similar equations as applied to the constitutions shown in FIGS. 1 to 23. In this constitution, since it is necessary that the light source 42 for irradiating the reflecting member irradiates the entire range, within which the reflecting member is to be moved, it is also preferred to provide a member for scanning the irradiation direction. In order to prevent the light emitted by the light source 42 for irradiating the reflecting member from being directly incident on the photoelectric conversion elements, it is necessary to provide such a member as a diffusion plate. Figures of the member are omitted herein.

(Tenth Embodiment)

The tenth embodiment will be described below. It is necessary to provide an output computing member 720 in order to obtain a three-dimensional position or a value used by the user by using the output of the PD (FIG. 26). The computing member contains an analog/digital conversion part for converting an analog voltage obtained from the PD to a digital signal, and a hardware or a software for operating the equations described in the foregoing. It is also preferred to provide a display member for displaying computing results as a cursor position or the like on a display of a personal computer. Even when the display is not used, it is also preferred that the computing results are used as control signals for other apparatuses.

(Eleventh Embodiment)

Figure 27:
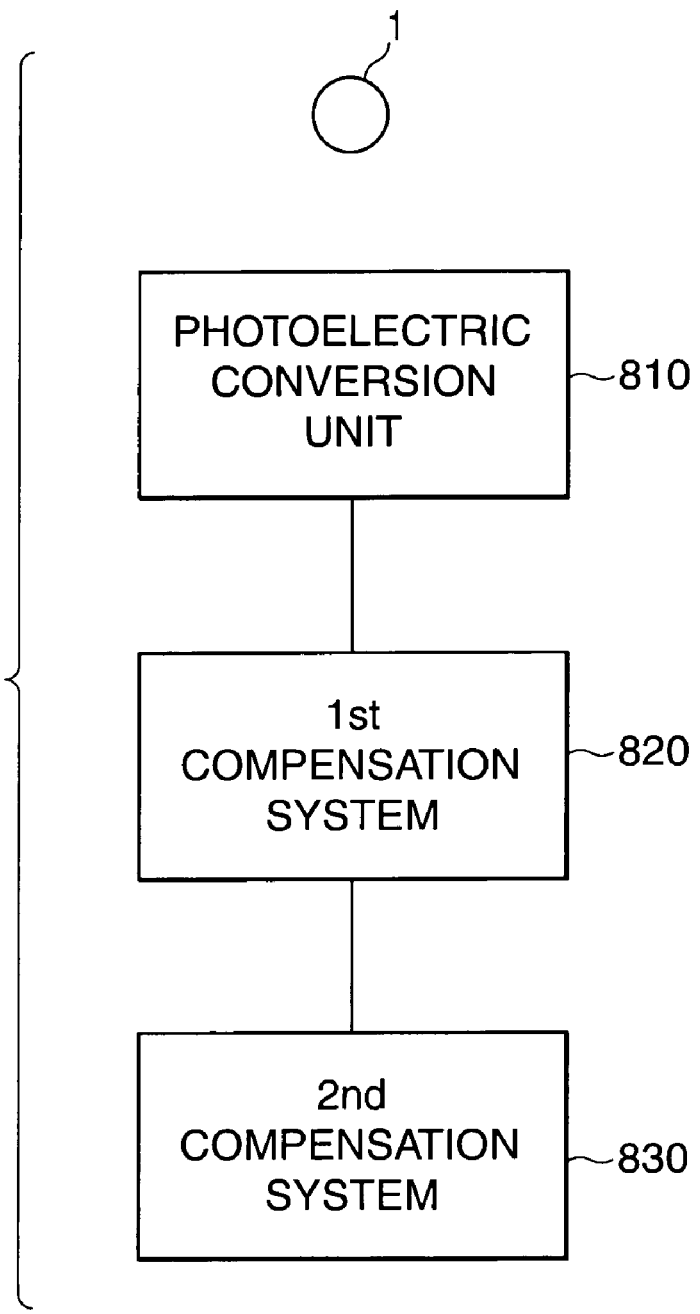
FIG. 27 is a diagram describing an eleventh embodiment of the invention.

The eleventh embodiment shown in FIG. 27 will be described below. Examples of compensation on computing the position of the light source include the following. A first compensation system 280 is applied to the case where there are fluctuations in the areas and the photoelectric conversion efficiencies of the PDs, forming the photoelectric conversion unit 810, in which it is preferred that the respective PDs are irradiated with uniform light, and the gain of the circuit is adjusted to obtain the same outputs from the PDs. Specifically, light emission is carried out from a light source that is arranged at a position on a straight line forming an angle of 45° with respect to the x axis with the intersecting points of the photoelectric conversion units as center, and the gain of the circuit is adjusted to obtain the same outputs from the two PDs in the respective photoelectric conversion units. Figures showing the compensation system are omitted herein.

A second compensation system 830 is applied to the case where fluctuations in output are necessarily compensated due to fluctuations within the plane of the transmissibility of coating films formed on the surfaces of the PDs, and light reflected on the surfaces of the PDs and the surface of the chassis incident on the other PDs. The fluctuations cannot be simply compensated by the gain of the circuit as in the first compensation system, and therefore the following system can be employed. Several points, the coordinates of which have been determined, are provided on the two-dimensional plane, on which the position of the light source is to be located. The light source is provided on the plane, and the position thereof is located. A conversion table or a conversion equation for differences between the original position thereof and the calculated position is prepared, and upon practical measurement, the position of the light source is compensated by using the table or equation. Figures showing the compensation system are omitted herein.

Figure 28:
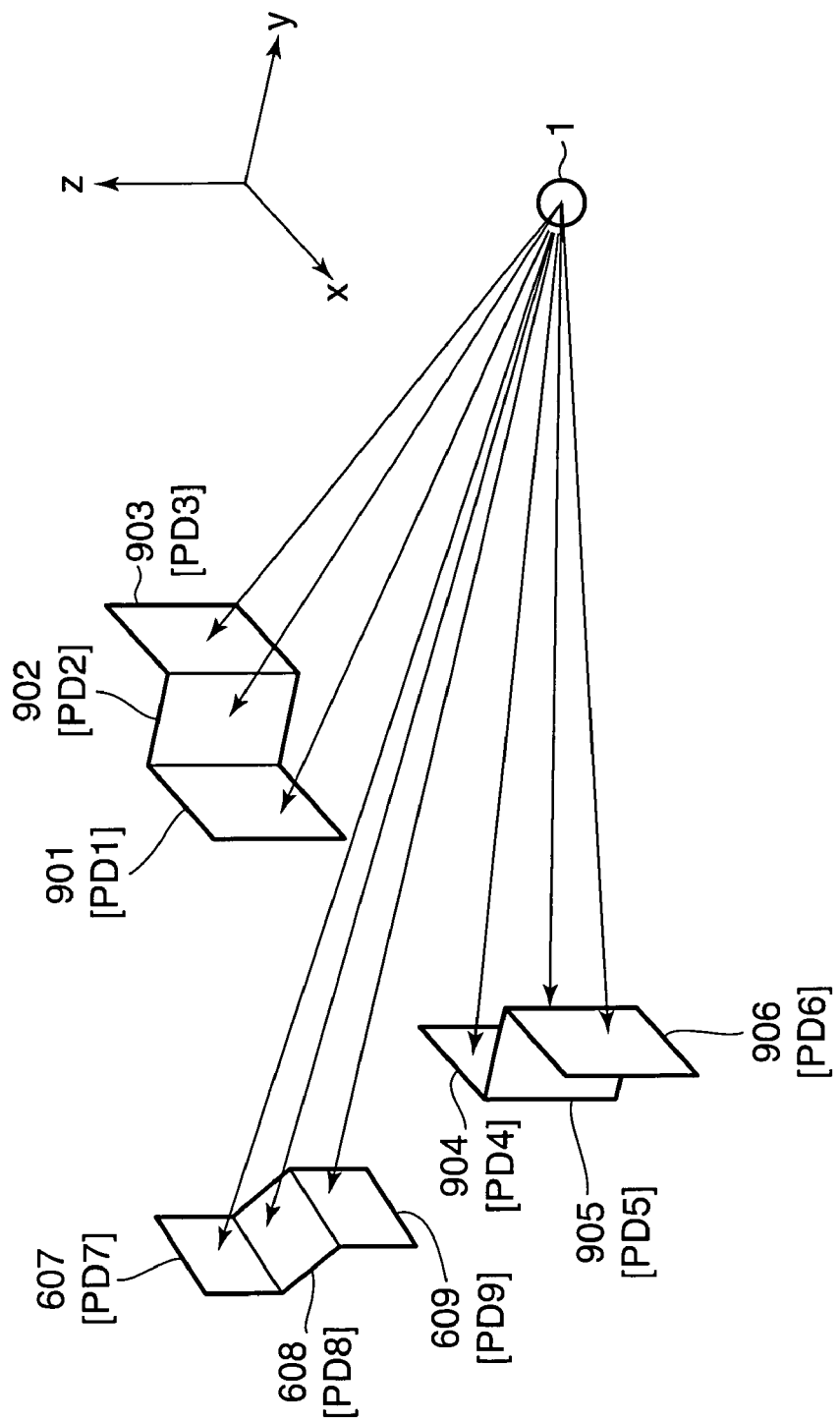
FIG. 28 is a diagram illustrating a twelfth exemplary embodiment of the invention.

FIG. 28 illustrates a twelfth exemplary embodiment of one or more aspects of the invention including a photoelectric conversion unit including 9 PDs (901–909). As illustrated, PD1 forms an angle of less than 180° with respect to PD2 while PD2 also forms an angle of greater than 180° with respect to PD3. PD4 forms an angle of less then 180° with PD5 while PD5 also forms an angle of greater than 180° with respect to PD6. PD7 forms an angle of less than 180° with respect to PD8 while PD8 also forms an angle of greater than 180° with PD9. Although in this exemplary embodiment, the angles are formed via PD edges which are in contact, as described above, the respective PDs need not be in contact. Further, as illustrated in FIG. 28 all the PDs (901–909) simultaneously face the diffused light source 1.

As described in the foregoing, according to the invention, errors having occurred due to the differences in optical density can be countervailed by using the combination of a unit of two PDs arranged inwardly and a unit of two PDs arranged outwardly in the photoelectric conversion units, whereby a smooth pointing device can be provided.

It is considered that the invention can also be applied to the following wide range of application fields.

Upon inputting on a personal computer by physically handicapped persons, it is possible that the light sources are attached to the fingers and the head, and movable ranges thereof are set as the moving range of the cursor over the display.

Movement of the body can be three-dimensionally measured upon rehabilitation. In this case, three-dimensional movements can be recorded, from which the progress of the rehabilitation can be known. The records of the three-dimensional movement can be transmitted to a distant place to receive advice from an authority in real time.

The system can be used for motion capture. Particularly, because the invention can be realized at low cost, a motion capture system for home use can be realized.

The system can be used for an input system for games. A combination of plural two-dimensional movements on a particular input device has been used, but the input can be realized with only one three-dimensional movement.

The position of a tip end of a working arm of a robot can be measured. Upon operating a robot from a remove place, smooth operation is difficult with the conventional one-dimensional or two-dimensional operation devices because it is hard to sense the vertical and transversal operations, but complicated operations can be smoothly carried out by using the system according to the invention.

The application fields of the invention are not limited to those described herein, but the invention can also be applied to other various fields.

The entire disclosure of Japanese Patent Application No. 2001-280945 filed on Sep. 17, 2001 including specification, claims, drawings and abstract is incorporated herein by reference in its entirety.

What is claimed is:

1. A photoelectric conversion unit usable in an apparatus for determining a location of a diffused light source, comprising:
   a first photoelectric conversion surface;
   a second photoelectric conversion surface which faces the first photoelectric conversion surface at an angle of less than 180° so as to form a valley fold;
   a third photoelectric conversion surface which has an angle of greater than 180° to the second photoelectric conversion surface so as to form a mountain fold,
   a fourth photoelectric conversion surface;
   a fifth photoelectric conversion surface which faces the fourth photoelectric conversion surface at an angle of less than 180° so as to form a valley fold; and
   a sixth photoelectric conversion surface which has an angle of greater than 180° to the fifth photoelectric conversion surface so as to form a mountain fold,
   wherein the first, second and third photoelectric conversion surfaces are arranged to face the diffused light source simultaneously, and
   wherein the fourth, fifth, and sixth photoelectric conversion surfaces are arranged to face the diffused light source simultaneously.

2. The photoelectric conversion unit as claimed in claim 1, further comprising:
   a seventh photoelectric conversion surface;
   an eighth photoelectric conversion surface which faces the seventh photoelectric conversion surface at an angle of less than 180° so as to form a valley fold; and
   a ninth photoelectric conversion surface which has an angle of greater than 180° to the eighth photoelectric conversion surface so as to form a mountain fold,
   wherein the seventh, eighth, and ninth photoelectric conversion surfaces are arranged to face the diffused light source simultaneously.

3. An apparatus for measuring a location, comprising:
   a photoelectric conversion unit which comprises a first photoelectric conversion surface, a second photoelectric conversion surface which faces the first photoelectric conversion surface at an angle of less than 180° so as to form a valley fold and a third photoelectric conversion surface which has an angle of greater than 180° to the second photoelectric conversion surface so as to form a mountain fold, wherein the first, second and third photoelectric conversion surfaces are arranged to face a diffused light source simultaneously; and
   means for calculating a value with regard to the location of the diffused light source by using outputs of the first, second and third photoelectric conversion surfaces, wherein the calculating means:
   calculates the value with regard to the location of the diffused light source by using a ratio of the outputs of the first and the second photoelectric conversion surfaces and a ratio of the outputs of the second and the third photoelectric conversion surfaces, and calculates the value with regard to the location of the diffused light source by calculating an average of the ratio of the outputs of the first and the second photoelectric conversion surfaces and the ratio of the outputs of the second and the third photoelectric conversion surfaces.

4. The apparatus for measuring a location as claimed in claim 3, wherein the calculating means corrects the value with regard to the location of the diffused light source by using a ratio of areas of the first, the second and the third photoelectric conversion surfaces.

5. The apparatus for measuring a location as claimed in claim 3, wherein the diffused light source is turned on intermittently or with a change in intensity.

6. The apparatus for measuring a location as claimed in claim 3, further comprising a diffusion member, through which light emitted from the diffused light source passes.

7. The apparatus for measuring a location as claimed in claim 6, wherein the diffusion member comprises a substantially transparent material and includes a diffusion lens.

8. The apparatus for measuring a location as claimed in claim 3, further comprising a film member that selectively transmits light of a particular wavelength provided between the light source and the photoelectric conversion surfaces at a position immediately after the light is emitted from the light source.

9. The apparatus for measuring a location as claimed in claim 3, further comprising a film member that selectively transmits light of a particular wavelength provided between the diffused light source and the photoelectric conversion surfaces at a position immediately before the light is incident on the photoelectric conversion surfaces.

10. The apparatus for measuring a location as claimed in claim 3, comprising a plurality of diffused light sources sequentially emitting light, wherein the calculating means calculates values with regard to the location of the plurality of diffused light sources, whereby positions of the plurality of diffused light sources are located.

11. The apparatus for measuring a location as claimed in claim 10, wherein the calculating means calculates the relative locations of the plurality of diffused light sources.

12. The apparatus for measuring a location as claimed in claim 11, wherein the calculating means calculates the distance or the variance among the plurality of diffused light sources.

13. The apparatus for measuring a location as claimed in claim 3, comprising a plurality of diffused light sources emitting light in light emission patterns different from one another, wherein the calculating means calculates values with regard to the location of the plurality of diffused light sources by discriminating the light emission patterns, whereby positions of the plurality of diffused light sources are located.

14. The apparatus for measuring a location as claimed in claim 3, wherein the diffused light source selectively emits light upon pressing a switch.

15. The apparatus for measuring a location as claimed in claim 3, wherein the light source changes a light emission mode upon pressing a switch.

16. The apparatus for measuring a location as claimed in claim 3, wherein the diffused light source comprises an irradiation source and a reflector reflecting a light irradiated from the irradiation source, and the value with regard to the location of the reflector is calculated.

17. The apparatus for measuring a location as claimed in claim 3, further comprising an output part outputting a signal to an apparatus in accordance with a measured value.

18. An apparatus for measuring a location, comprising:
a photoelectric conversion unit which comprises a first photoelectric conversion surface, a second photoelectric conversion surface which faces the first photoelectric conversion surface at an angle of less than 180° so as to form a valley fold and a third photoelectric conversion surface which has an angle of greater than 180° to the second photoelectric conversion surface so as to form a mountain fold, wherein the first, second and third photoelectric conversion surfaces are arranged to face a diffused light source simultaneously; and means for calculating a value with regard to the location of the diffused light source by using outputs of the first, second and third photoelectric conversion surfaces, wherein the calculating means corrects the value or changes a gain of an amplifier connected to the photoelectric conversion surface by using outputs of the photoelectric conversion surfaces being irradiated with a diffused light having a predetermined intensity.

19. An apparatus for measuring a location, comprising:
a photoelectric conversion unit which comprises a first photoelectric conversion surface, a second photoelectric conversion surface which faces the first photoelectric conversion surface at an angle of less than 180° so as to form a valley fold and a third photoelectric conversion surface which has an angle of greater than 180° to the second photoelectric conversion surface so as to form a mountain fold, wherein the first, second and third photoelectric conversion surfaces are arranged to face a diffused light source simultaneously; and means for calculating a value with regard to the location of the diffused light source by using outputs of the first, second and third photoelectric conversion surfaces, wherein the calculating means corrects the value by using a correction table or a correction equation obtained by using outputs of the photoelectric conversion surfaces being irradiated with a diffused light at a predetermined position.

20. A photoelectric conversion unit usable in an apparatus for determining a location of a diffused light source, comprising:
a first photoelectric conversion surface;
a second photoelectric conversion surface which faces the first photoelectric conversion surface at an angle of less than 180° so as to form a valley fold;
a third photoelectric conversion surface which has an angle of greater than 180° to the second photoelectric conversion surface so as to form a mountain fold;
a fourth photoelectric conversion surface;
a fifth photoelectric conversion surface;
a sixth photoelectric conversion surface; and
a seventh photoelectric conversion surface,
wherein the fourth photoelectric conversion surface and the fifth photoelectric conversion surface are arranged to form an angle of less than 180° so as to form a valley fold and the sixth photoelectric conversion surface and the seventh photoelectric conversion surface are arranged to form an angle of greater than 180° so as to form a mountain fold, and
wherein the first, second, third, fourth, fifth, sixth and seventh photoelectric conversion surfaces are arranged to face the diffused light source simultaneously.

21. An apparatus for measuring a location, comprising:
a photoelectric conversion unit which comprises a first photoelectric conversion surface, a second photoelectric conversion surface, a third photoelectric conversion surface, and a fourth photoelectric conversion surface, wherein the first photoelectric conversion surface and the second photoelectric conversion surface are arranged to form an angle of less than 180° so as to form a valley fold and the third photoelectric conversion surface and the fourth photoelectric conversion surface are arranged to form an angle of greater than 180° so as to form a mountain fold, and the first, second, third and fourth photoelectric conversion surfaces are arranged to face the diffused light source simultaneously; and
means for calculating a value with regard to the location of the diffused light source by using outputs of the first, second, third and fourth photoelectric conversion surfaces, wherein the calculating means;
calculates the value with regard to the location of the diffused light source by using a ratio of the outputs of the first and the second photoelectric conversion surfaces and a ratio of the outputs of the third and the fourth photoelectric conversion surfaces, and
calculates the value with regard to the location of the diffused light source by calculating an average of the ratio of the outputs of the first and the second photoelectric conversion surfaces and the ratio of the outputs of the third and the fourth photoelectric conversion surfaces.

22. The apparatus for measuring a location as claimed in claim 21, wherein the calculating means corrects the value with regard to the location of the diffused light source by using a ratio of areas of the first, second, third and fourth photoelectric conversion surfaces.

23. The apparatus for measuring a location as claimed in claim 21, wherein the diffused light source is turned on intermittently or with a change in intensity.

24. The apparatus for measuring a location as claimed in claim 21, further comprising a diffusion member, through which light emitted from the diffused light source passes.

25. The apparatus for measuring a location as claimed in claim 21, wherein the diffusion member comprises a substantially transparent material and includes a diffusion lens.

26. The apparatus for measuring a location as claimed in claim 21, further comprising a film member that selectively transmits light of a particular wavelength provided between the light source and the photoelectric conversion surfaces at a position immediately after the light is emitted from the light source.

27. The apparatus for measuring a location as claimed in claim 21, further comprising a film member that selectively transmits light of a particular wavelength provided between the diffused light source and the photoelectric conversion surfaces at a position immediately before the light is incident on the photoelectric conversion surfaces.

28. The apparatus for measuring a location as claimed in claim 21, comprising a plurality of diffused light sources sequentially emitting light, wherein the calculating means calculates values with regard to the location of the plurality of diffused light sources, whereby positions of the plurality of diffused light sources are located.

29. The apparatus for measuring a location as claimed in claim 28, wherein the calculating means calculates the relative locations of the plurality of diffused light sources.

30. The apparatus for measuring a location as claimed in claim 29, wherein the calculating means calculates the distance or the variance among the plurality of diffused light sources.

31. The apparatus for measuring a location as claimed in claim 21, comprising a plurality of diffused light sources emitting light in light emission patterns different from one another, wherein the calculating means calculates values with regard to the location of the plurality of diffused light sources by discriminating the light emission patterns, whereby positions of the plurality of diffused light sources are located.

32. The apparatus for measuring a location as claimed in claim 29, wherein the diffused light source selectively emits light upon pressing a switch.

33. The apparatus for measuring a location as claimed in claim 21, wherein the light source changes a light emission mode upon pressing a switch.

34. The apparatus for measuring a location as claimed in claim 21, wherein the diffused light source comprises an irradiation source and a reflector reflecting a light irradiated from the irradiation source, and the value with regard to the location of the reflector is calculated.

35. The apparatus for measuring a location as claimed in claim 21, further comprising an output part outputting a signal to an apparatus in accordance with a measured value.

36. An apparatus for measuring at least one of a location and a direction, comprising:
a photoelectric conversion unit which comprises a first photoelectric conversion surface, a second photoelectric conversion surface, a third photoelectric conversion surface, and a fourth photoelectric conversion surface, wherein the first photoelectric conversion surface and the second photoelectric conversion surface are arranged to form an angle of less than 180° so as to form a valley fold and the third photoelectric conversion surface and the fourth photoelectric conversion surface are arranged to form an angle of greater than 180° so as to form a mountain fold, and the first, second, third and fourth photoelectric conversion surfaces are arranged to face the diffused light source simultaneously; and
means for calculating a value with regard to the at least one of the location of and a direction to the diffused light source by using outputs of the first, second, third and fourth photoelectric conversion surfaces,
wherein the calculating means corrects the value or changes a gain of an amplifier connected to the photoelectric conversion surface by using outputs of the photoelectric conversion surfaces being irradiated with a diffused light having a predetermined intensity.

37. An apparatus for measuring at least one of a location and a direction, comprising:
a photoelectric conversion unit which comprises a first photoelectric conversion surface, a second photoelectric conversion surface, a third photoelectric conversion surface, and a fourth photoelectric conversion surface, wherein the first photoelectric conversion surface and the second photoelectric conversion surface are arranged to form an angle of less than 180° so as to form a valley fold and the third photoelectric conversion surface and the fourth photoelectric conversion surface are arranged to form an angle of greater than 180° so as to form a mountain fold, and the first, second, third and fourth photoelectric conversion surfaces are arranged to face the diffused light source simultaneously; and means for calculating a value with regard to the at least one of the location of and a direction to the diffused light source by using outputs of the first, second, third and fourth photoelectric conversion surfaces, wherein the calculating means corrects the value by using a correction table or a correction equation obtained by using outputs of the photoelectric conversion surfaces being irradiated with a diffused light at a predetermined position.

* * * * *